(12) United States Patent
Latino et al.

(10) Patent No.: US 12,276,374 B2
(45) Date of Patent: Apr. 15, 2025

(54) STRUCTURE ATTACHMENT FOR HANGING SUPPORT SYSTEM

(71) Applicant: Eaton Intelligent Power Limited, Dublin (IE)

(72) Inventors: Richard Michael Latino, Sterling, MA (US); David Charles Brooks, Greenville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 592 days.

(21) Appl. No.: 17/221,138

(22) Filed: Apr. 2, 2021

(65) Prior Publication Data
US 2021/0310609 A1   Oct. 7, 2021

Related U.S. Application Data

(60) Provisional application No. 63/005,024, filed on Apr. 3, 2020.

(51) Int. Cl.
| | | |
|---|---|---|
| *F16M 13/02* | (2006.01) | |
| *F16B 2/06* | (2006.01) | |
| *F16L 3/00* | (2006.01) | |

(52) U.S. Cl.
CPC ........... *F16M 13/022* (2013.01); *F16B 2/065* (2013.01); *F16L 3/00* (2013.01)

(58) Field of Classification Search
CPC ....... F16M 13/022; F16B 2/65; F16B 37/044; F16L 3/16
USPC ......................................................... 248/324
See application file for complete search history.

(56) References Cited

U.S. PATENT DOCUMENTS

| | | | |
|---|---|---|---|
| 5,149,040 A | | 9/1992 | Heath |
| 5,667,181 A | * | 9/1997 | van Leeuwen ........... E04B 9/18 52/39 |
| 6,511,028 B1 | | 1/2003 | Gretz |
| 7,758,003 B2 | | 7/2010 | Pourtier et al. |
| 7,758,011 B2 | * | 7/2010 | Haddock ............... F24S 25/636 248/500 |
| 7,887,248 B2 | * | 2/2011 | Heath ..................... F16C 11/12 248/323 |
| 8,833,714 B2 | * | 9/2014 | Haddock ............... F24S 25/615 248/500 |

(Continued)

FOREIGN PATENT DOCUMENTS

| | | |
|---|---|---|
| FR | 2870300 A1 | 11/2005 |
| JP | 3152066 U | 7/2009 |

(Continued)

OTHER PUBLICATIONS

International Search Report and Written Opinion, from PCT/EP2021/025126, mailed Jun. 22, 2021, 12 pages.

*Primary Examiner* — Todd M Epps
(74) *Attorney, Agent, or Firm* — Stinson LLP

(57) ABSTRACT

A structure attachment for a hanging support system includes an attachment body and a structure fastener coupled to the attachment body and configured to fasten the structure attachment to a structural support. A rod fastener is coupled to the attachment body and defines at least one threaded opening configured to mate with a threaded rod. The rod fastener is selectively movable relative to the structure fastener to adjust an angle between an axis of the threaded opening and a longitudinal axis of the structure fastener.

9 Claims, 29 Drawing Sheets

(56) References Cited

U.S. PATENT DOCUMENTS

| | | | | |
|---|---|---|---|---|
| 9,464,665 | B2 * | 10/2016 | Heath | F16L 3/16 |
| 9,879,716 | B2 * | 1/2018 | Heath | F16C 11/06 |
| 11,885,139 | B2 * | 1/2024 | Haddock | F24S 25/615 |
| 2017/0097038 | A1 * | 4/2017 | Heath | F16L 3/16 |
| 2017/0194781 | A1 | 7/2017 | Bentley et al. | |

FOREIGN PATENT DOCUMENTS

| | | |
|---|---|---|
| KR | 101751963 B1 | 6/2017 |
| KR | 1020190007138 A | 1/2019 |
| WO | 2011022139 A1 | 2/2011 |

* cited by examiner

STRUCTURE ATTACHMENT FOR HANGING SUPPORT SYSTEM

CROSS-REFERENCE TO RELATED APPLICATION

This application claims the benefit of U.S. Provisional Application No. 63/005,024, filed Apr. 3, 2020, the entirety of which is hereby incorporated by reference.

FIELD OF THE DISCLOSURE

The present disclosure generally relates to a structure attachment for a hanging support system.

BACKGROUND OF THE DISCLOSURE

One type of hanging support system for pipes, conduits, and other similar components in a structure or building includes a rod or pipe (e.g., a threaded rod) connected to and extending between a component attachment configured to attach to the supported component (e.g., a fire sprinkler branch line, an air duct, a water pipe, a conduit, etc.), and a structure attachment (or upper attachment) configured to attach to the structure (e.g., structure of a building). The structure attachment may be configured to attach to concrete, steel or wood structures, for example.

In a particular application of a seismic bracing system, the hanging support system is a fire sprinkler branch line restraint that prevents movement of fire sprinkler branch lines which could cause damage to themselves, the structure or other nearby non-structural systems, such as air handling ducts, plumbing or electrical systems. The structure (or upper) restraint may also be used in a hanger system for supporting and hanging components not requiring a seismic bracing system.

SUMMARY

In one aspect, a structure attachment for a hanging support system generally comprises an attachment body and a structure fastener coupled to the attachment body and configured to fasten the structure attachment to a structural support. A rod fastener is coupled to the attachment body and defines at least one threaded opening configured to mate with a threaded rod. The rod fastener is selectively movable relative to the structure fastener to adjust an angle between an axis of the threaded opening and a longitudinal axis of the structure fastener.

DETAILED DESCRIPTION OF THE DISCLOSURE

Figure 1:
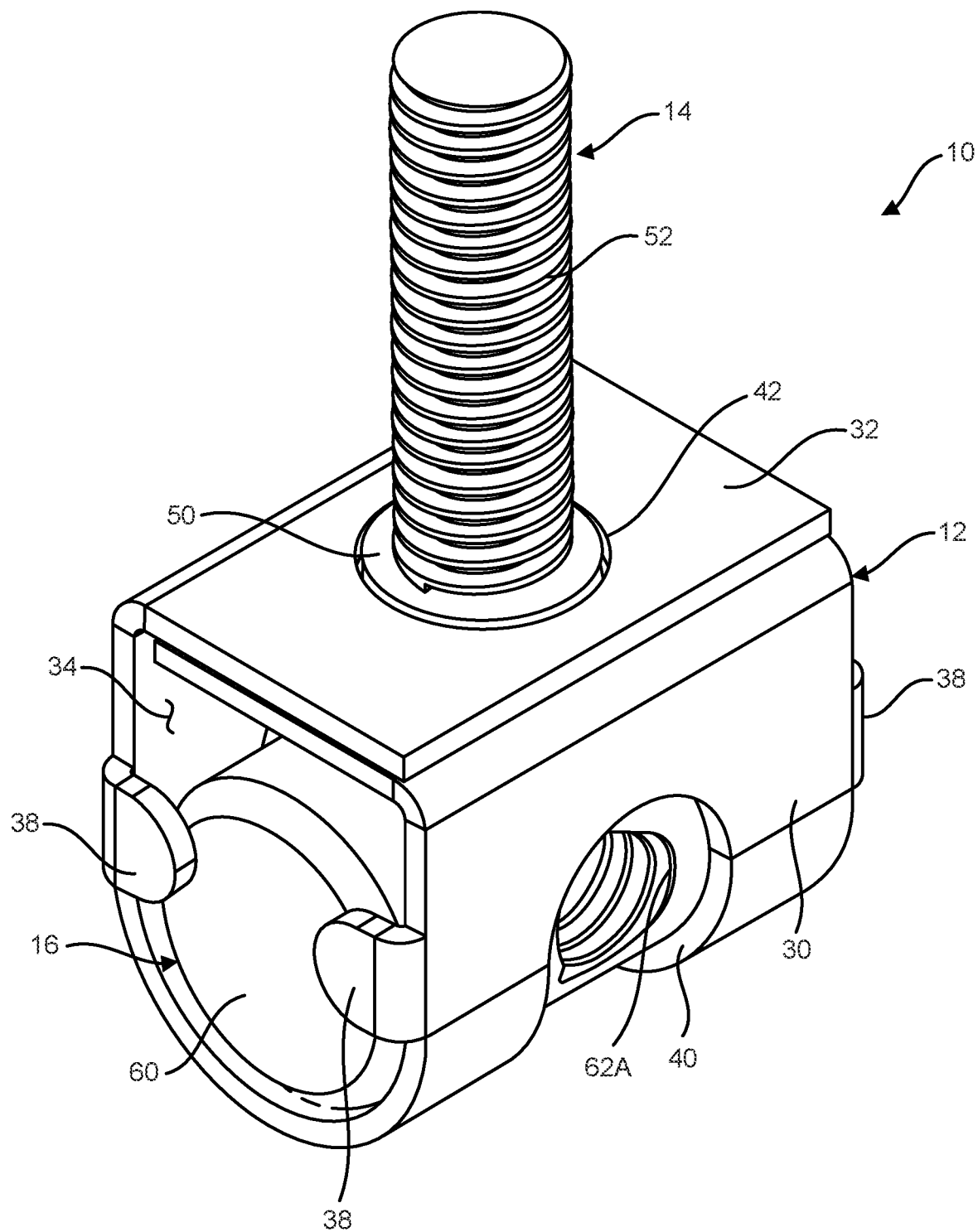
FIG. 1 is a perspective view of a first embodiment of a structure (or upper) attachment for a hanging support system.

Described herein are various embodiments of a structure (or upper) attachment for a hanging support system. The structure attachment embodiments are suitable for use as the upper restraint attachment in fire sprinkler branch line restraint that prevents movement of fire sprinkler branch lines which could cause damage to themselves, the structure or other nearby non-structural systems, such as air handling ducts, plumbing or electrical systems. In addition, the embodiments of the structure attachment are suitable for use in different hanger systems for supporting and hanging components not requiring a seismic bracing system.

Referring to FIGS. 1-10, an embodiment of a structure (or upper) attachment for a hanging support system constructed according to the teachings of the present disclosure is generally indicated at reference numeral 10. The structure attachment 10 generally includes an attachment body, generally indicated at 12; a structure fastener, generally indicated at 14, coupled to the attachment body and configured to fasten the structure attachment to a structural support S (e.g., a structural support of a building); and a rod fastener, generally indicated at 16, coupled to the attachment body and configured to fasten the structure attachment to a threaded rod. An example of a hanging support system including the structure attachment 10 is indicated generally as reference numeral 20 in FIG. 3. When the hanging support system 20 is assembled and installed, the threaded rod 22 extends outward from the structure attachment 10 and is attached to a component attachment 24 (e.g., a clamp, holder or other component) configured to couple to the hanging component 26, such as a fire sprinkler branch line, a pipe, a conduit, or other hanging component.

Figure 2:
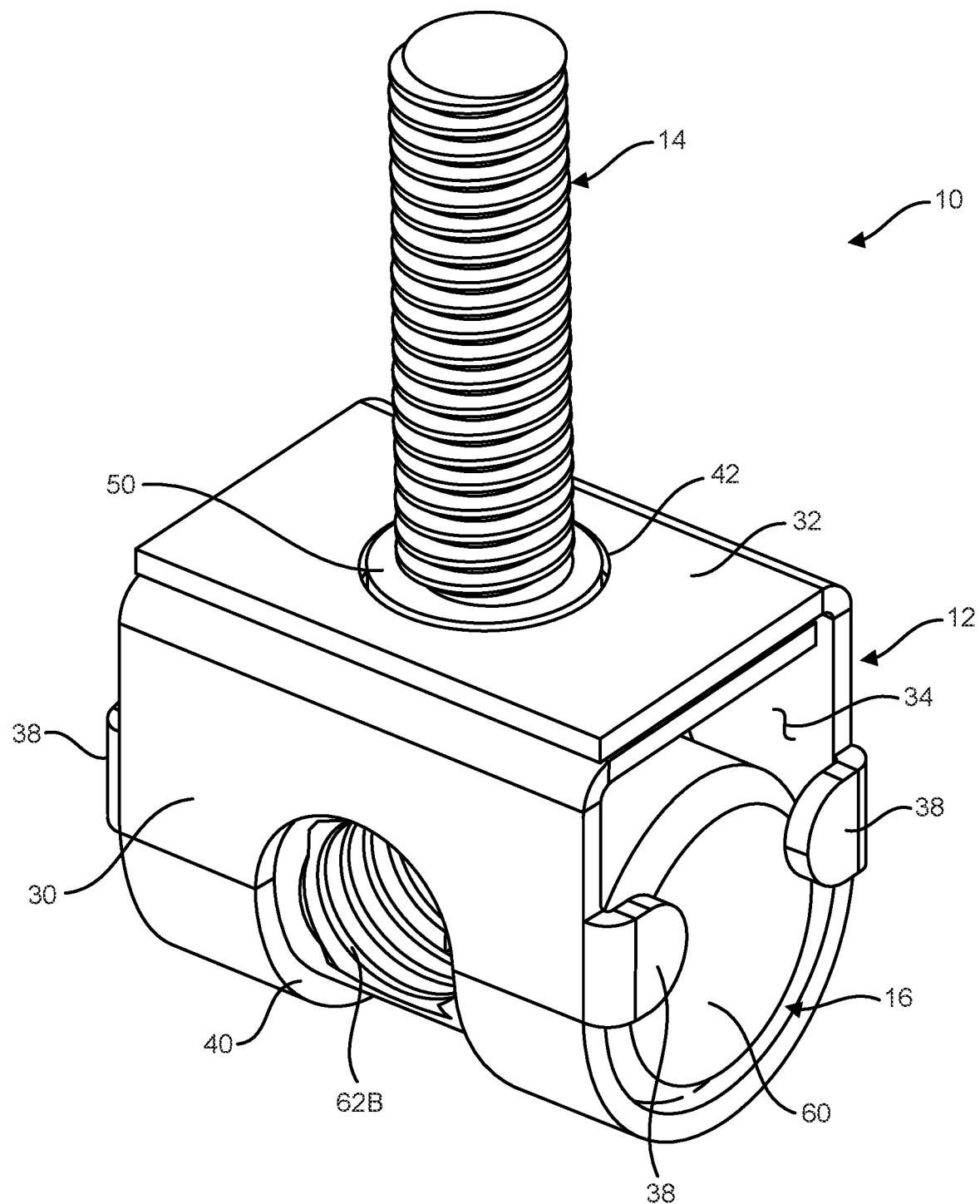
FIG. 2 is another perspective view of the first embodiment of the structure attachment for a hanging support system.

The illustrated attachment body 12 includes a channel-shaped (e.g., U-shaped) wall 30 defining a saddle bearing configured to support the rod fastener 16, and an upper wall 32 closing an upper end of the channel-shaped wall. Together, the channels-shaped wall 30 and the upper wall 32 define an interior 34 in which the rod fastener 16 is received. The channel-shaped wall 30 has an arcuate bottom and opposing sides. The attachment body 12 has a length L1 (FIG. 7), and opposite longitudinal ends of the attachment body 12 are open for receiving the rod fastener 16 therein. Retention fingers 38 extend inward from opposite sides of the channel-shaped wall 30 at each longitudinal end of the attachment body 12, although the fingers may be at only one of the longitudinal ends. The retention fingers 38 are generally movable relative to the attachment body 12 (e.g., about living hinges connecting the fingers to the attachment body) to allow the rod fastener 16 to be inserted into the attachment body 12 when the fingers extend longitudinally outward from the respective longitudinal end, and to capture and retain the rod fastener in the attachment body when the fingers extend inward and generally transverse to the longitudinal ends, as shown in FIGS. 1 and 2, for example.

For reasons explained below, the channel-shaped wall 30 defines an opening or window 40 (e.g., slot shaped window) having a length extending transverse to the length L1 of the attachment body 12 across the channel-shaped wall through the sides and the bottom of the attachment body. Also, the upper wall 32 defines a fastener opening 42 through which the structure fastener 14 extends, as explained below. The axis of the opening extends transverse to the length L1 of the attachment body 12. The illustrated upper wall 32 includes overlapping flanges (e.g., integrally formed flanges) extending inward from respective upper ends of the sides of the channel-shaped wall 30. Aligned openings in each flange defines the fastener opening 42. The upper wall 32 may be formed in other ways. The illustrated attachment body 12 is an integrally formed, one-piece component, which may be formed from a sheet of metal (i.e., fabricated from sheet metal), such as steel. The attachment body 12 may be formed in other ways, and one or more of the respective components and/or structures may be formed separately and subsequently coupled together for form the attachment body.

Figure 3:
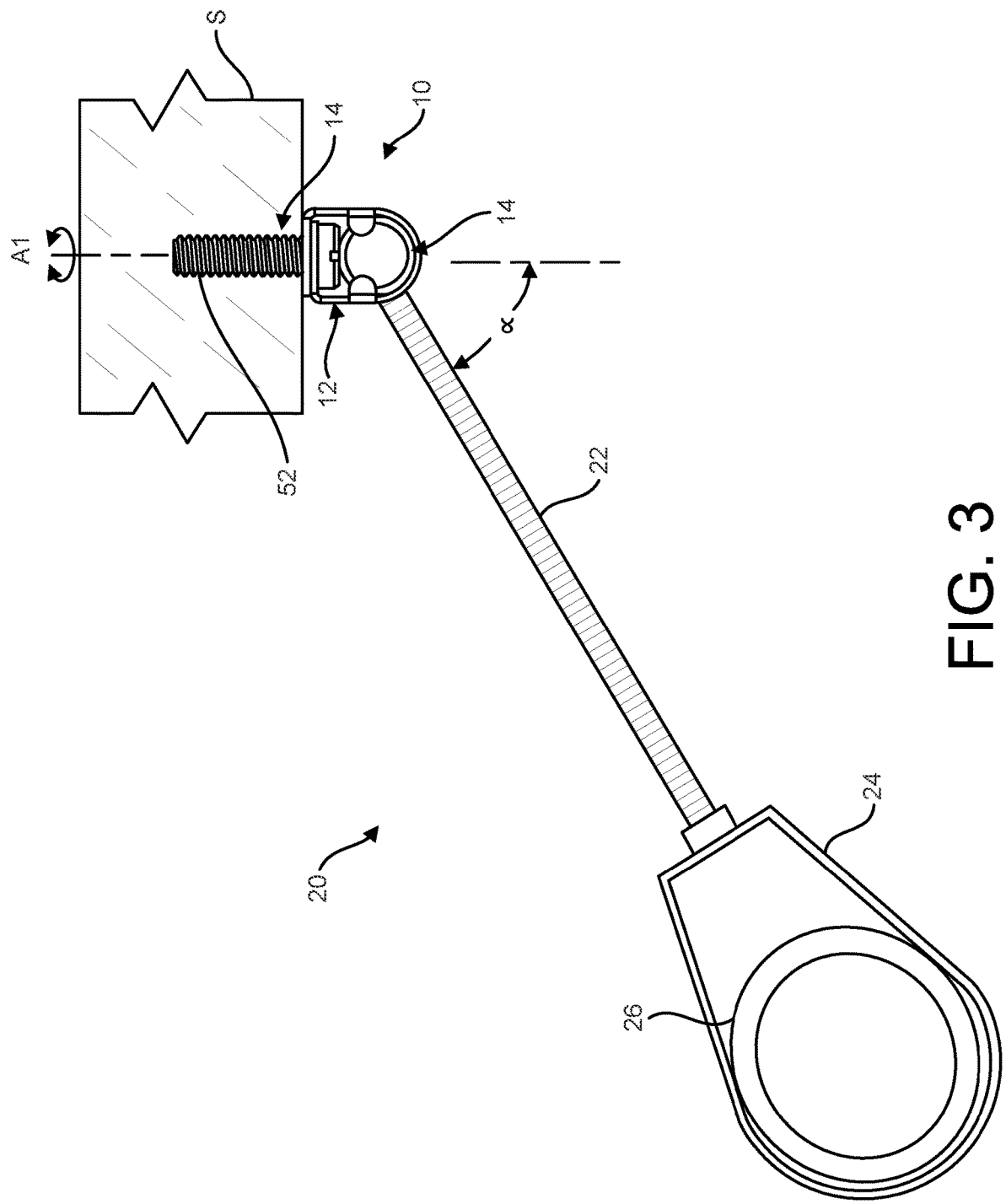
FIG. 3 is a side view of the first embodiment of the structure attachment coupled to a structure and hanging attachment.
Figure 4:
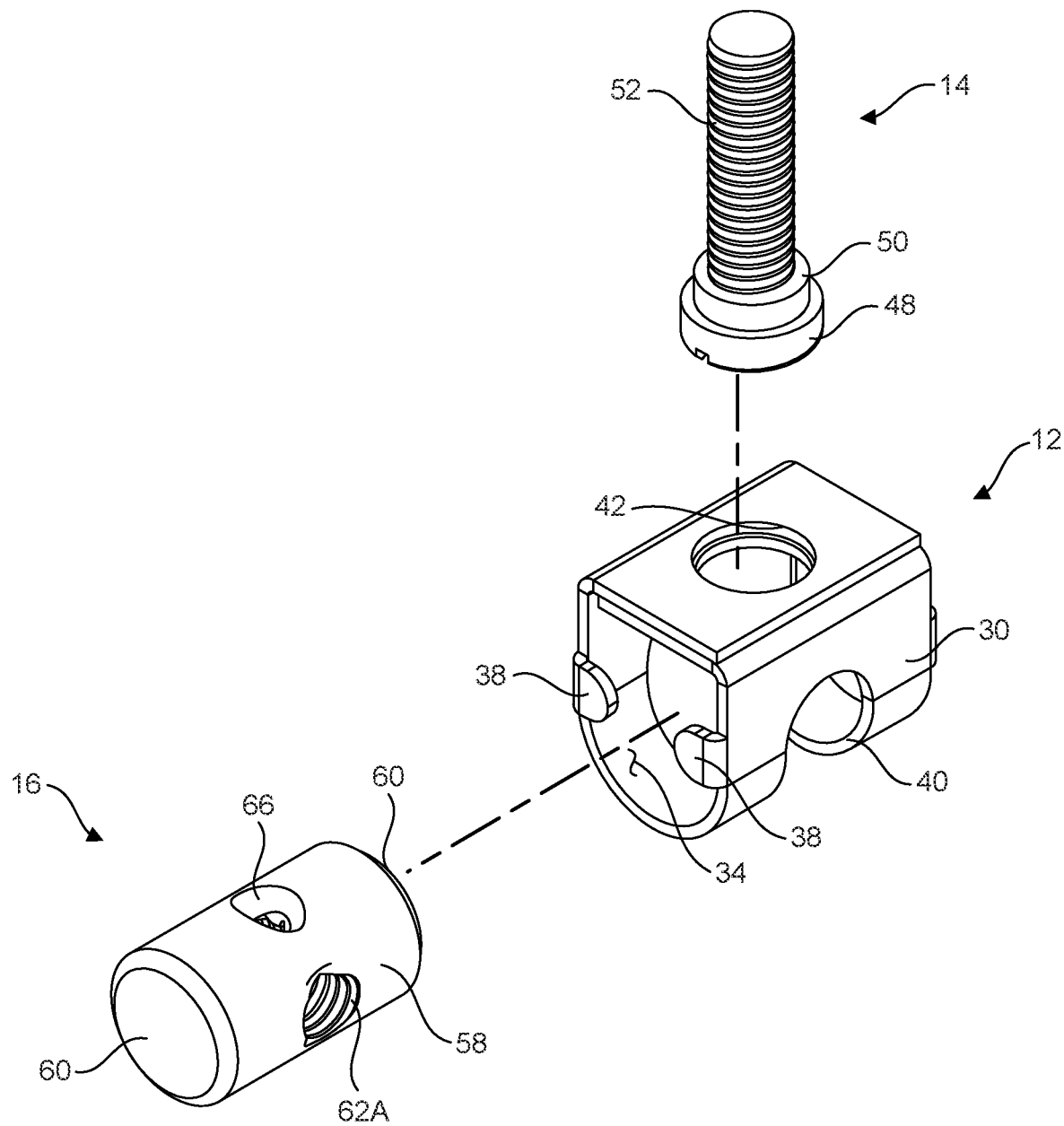
FIG. 4 is an exploded view of the first embodiment of the structure attachment.
Figure 5:
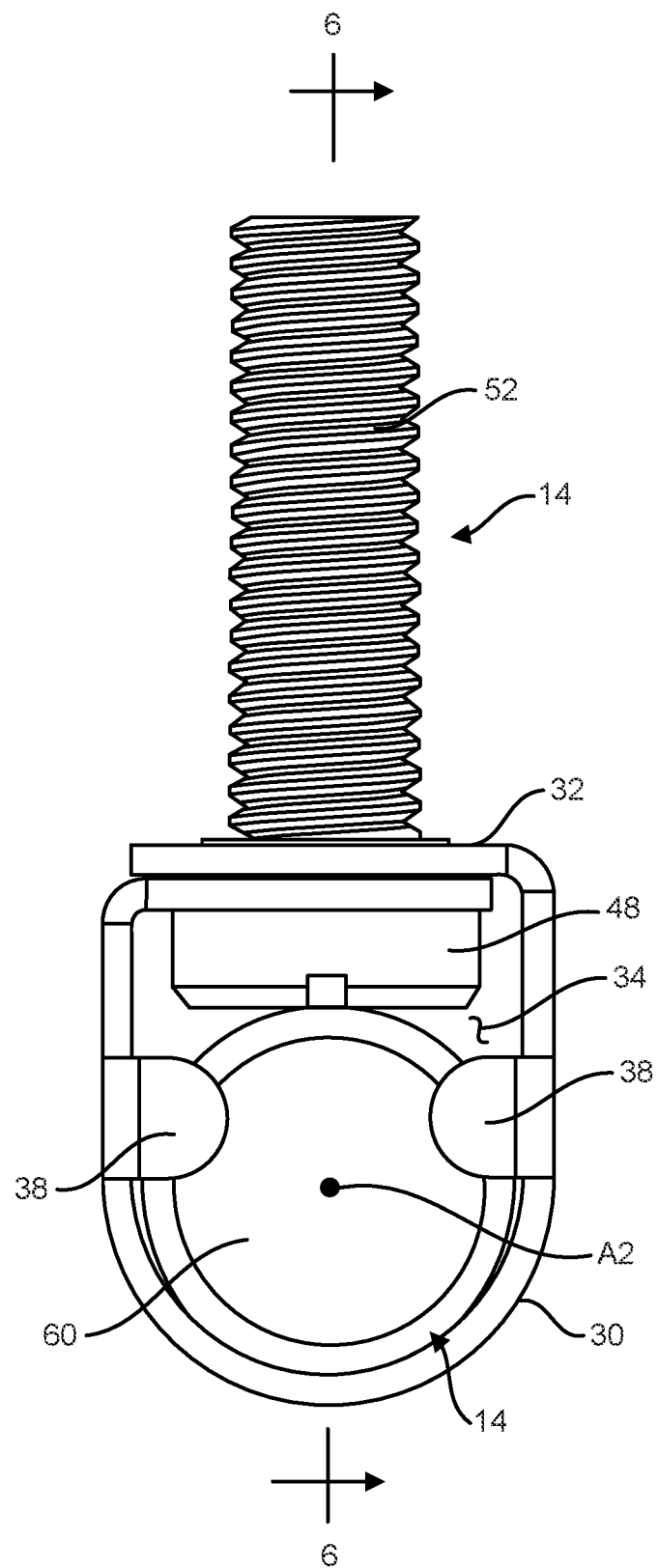
FIG. 5 is a side view of the first embodiment of the structure attachment.
Figure 6:
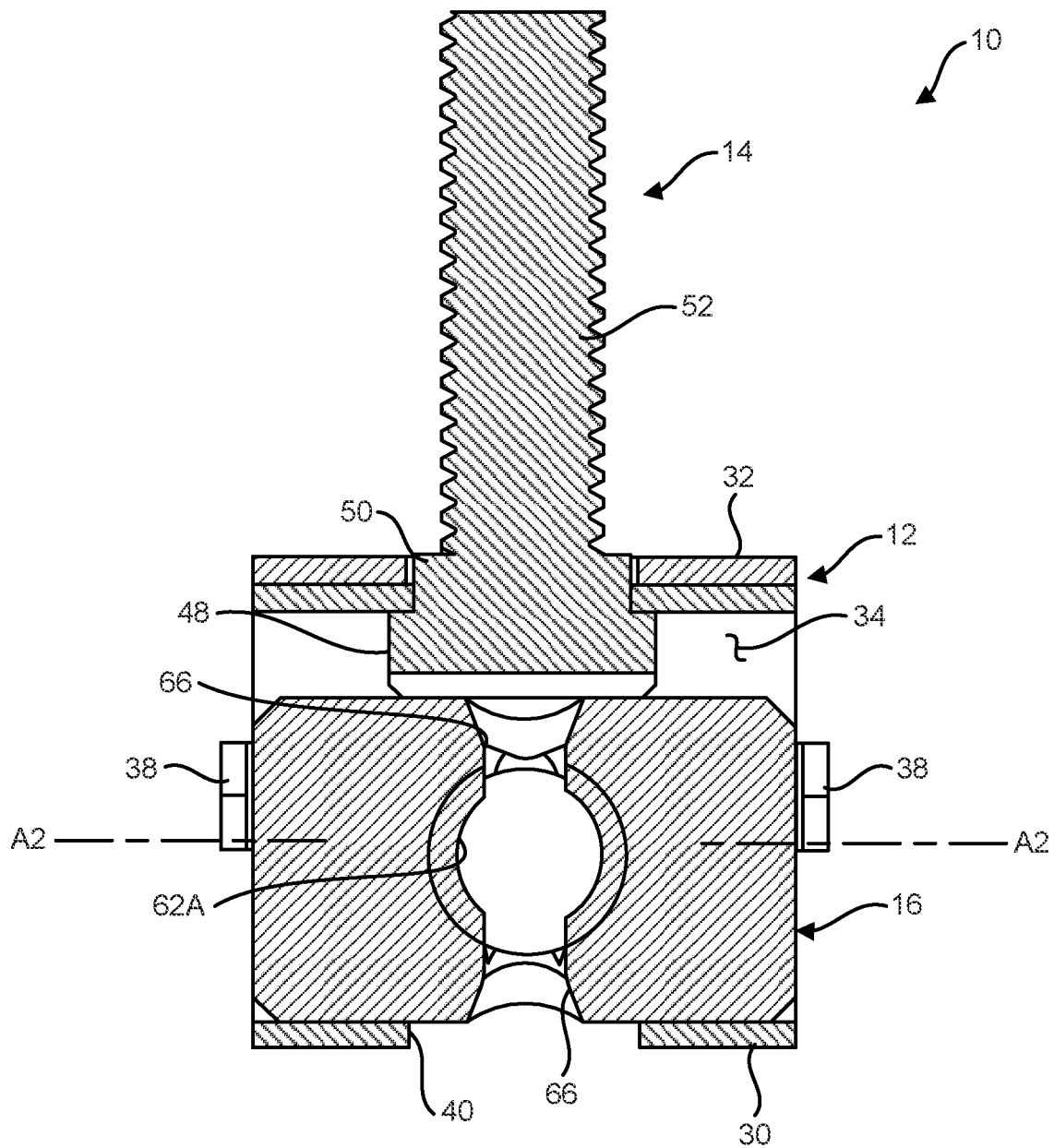
FIG. 6 is a cross-section of the first embodiment of the structure attachment taken through 6-6 of FIG. 5.
Figure 7:
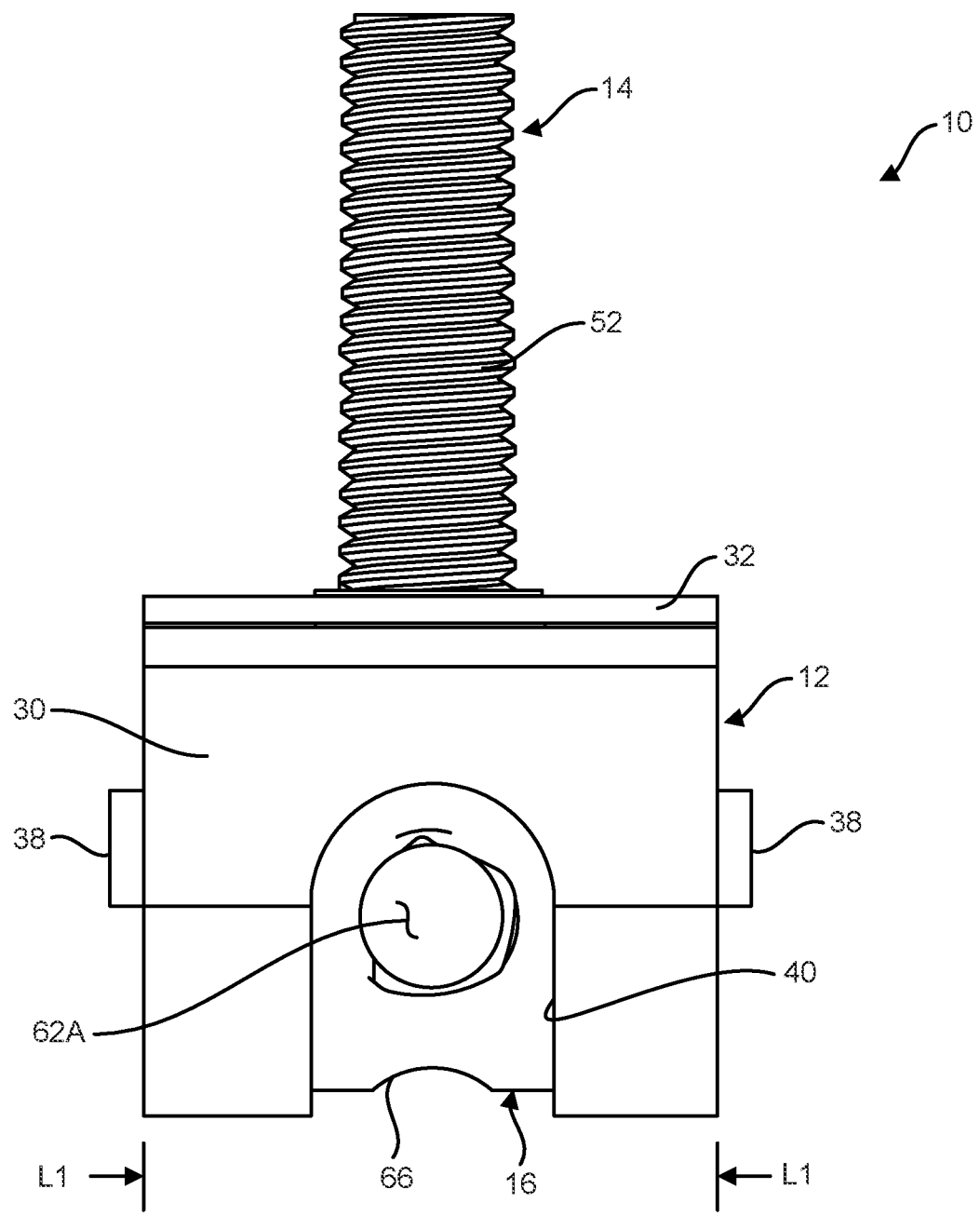
FIG. 7 is a side view of the first embodiment of the structure attachment.
Figure 8:
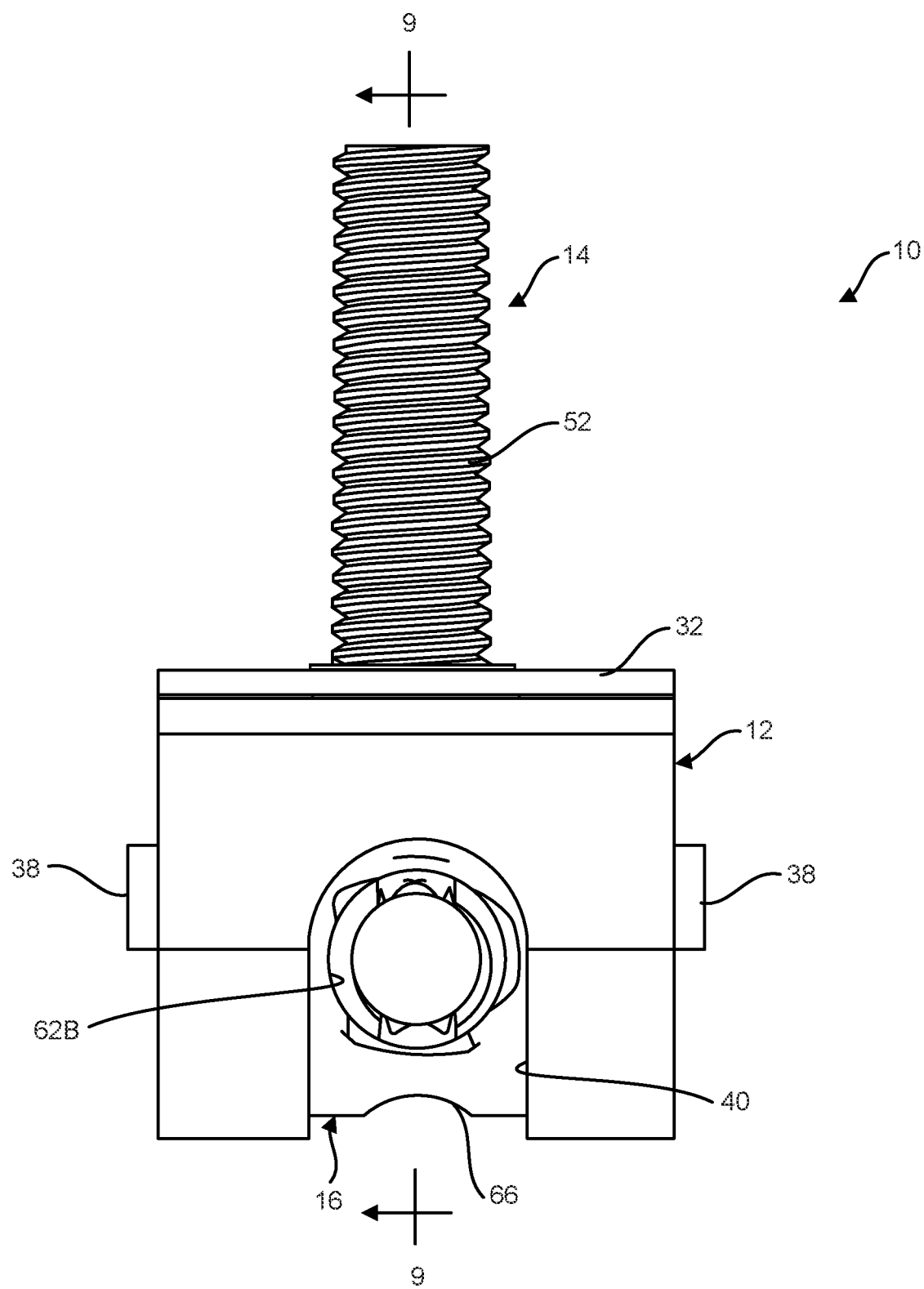
FIG. 8 is a front view of the first embodiment of the structure attachment.
Figure 9:
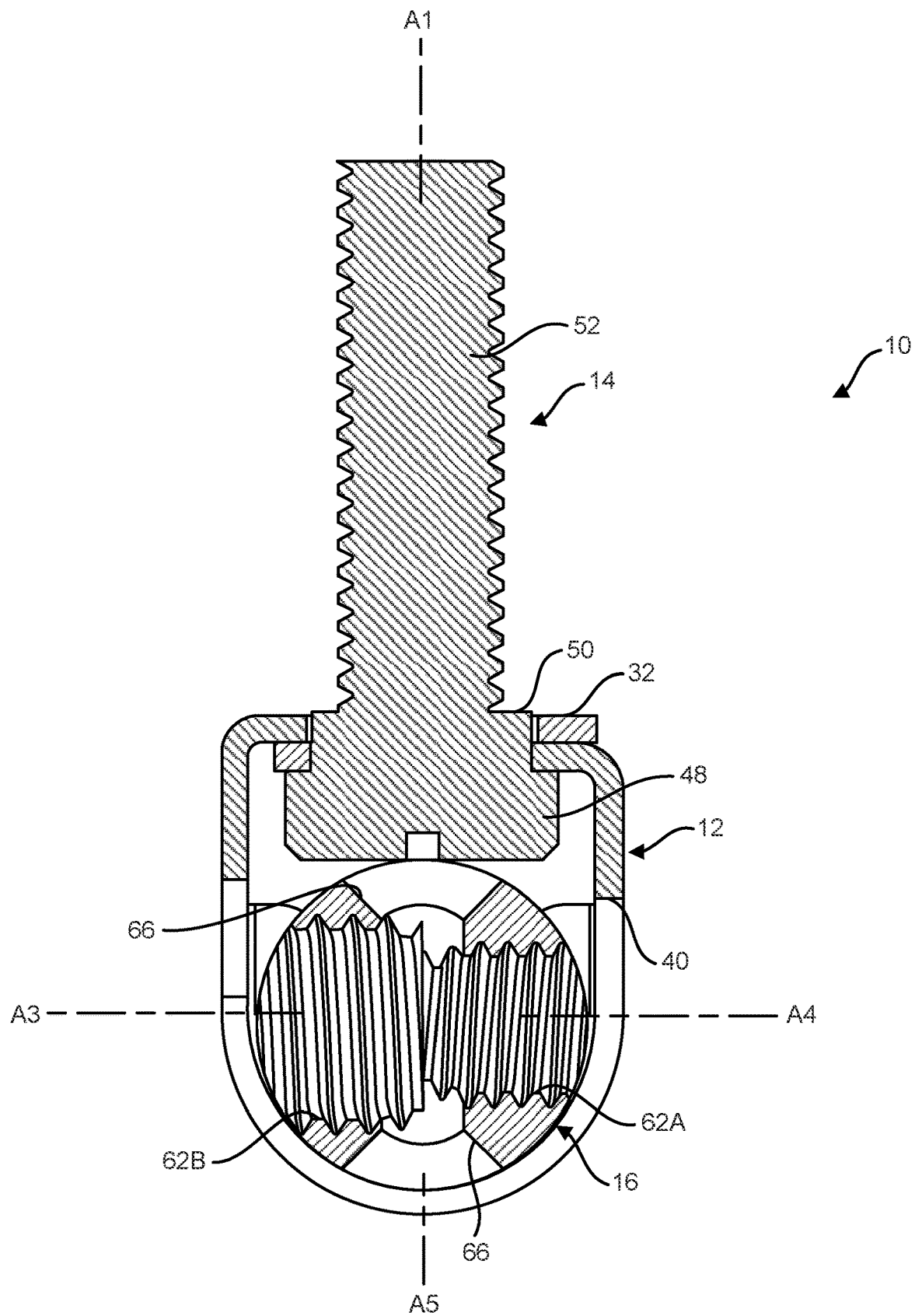
FIG. 9 is a cross section of the first embodiment of the structure attachment taken through 9-9 of FIG. 8.
Figure 10:
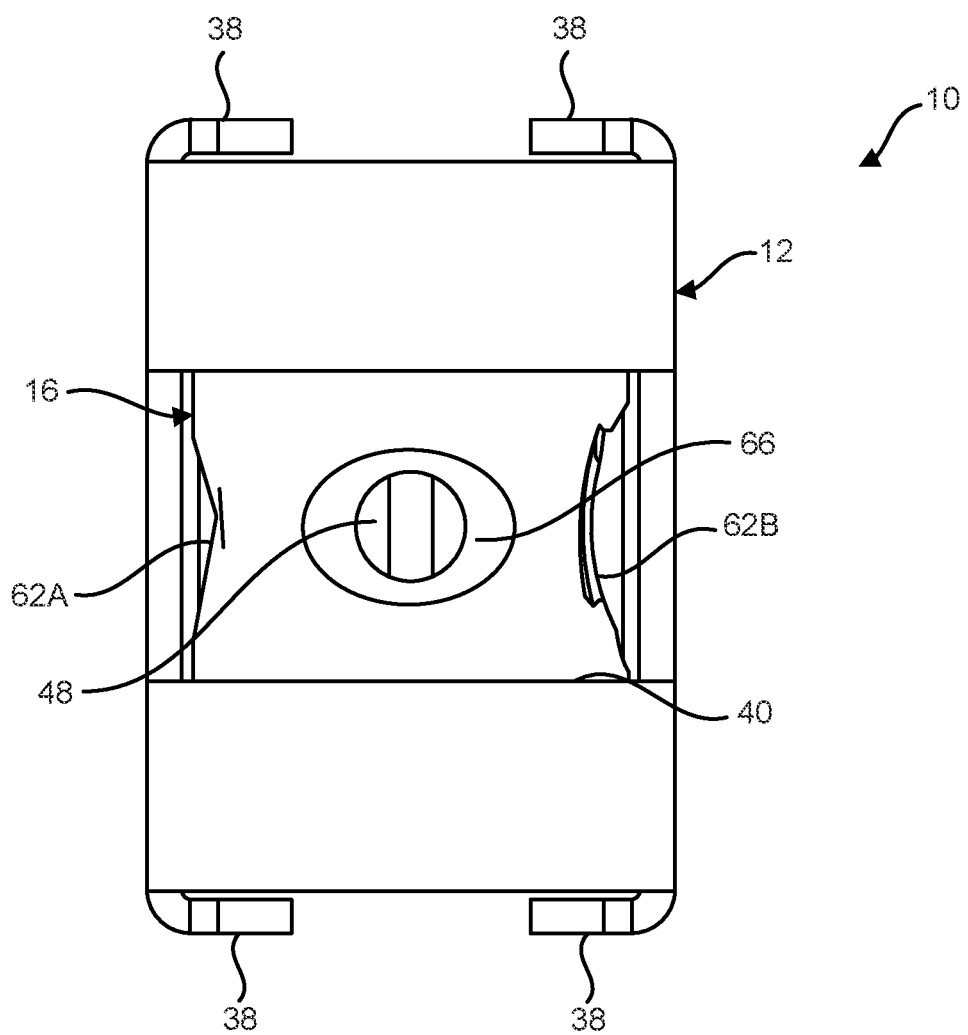
FIG. 10 is a bottom view of the first embodiment of the structure attachment.
Figure 11:
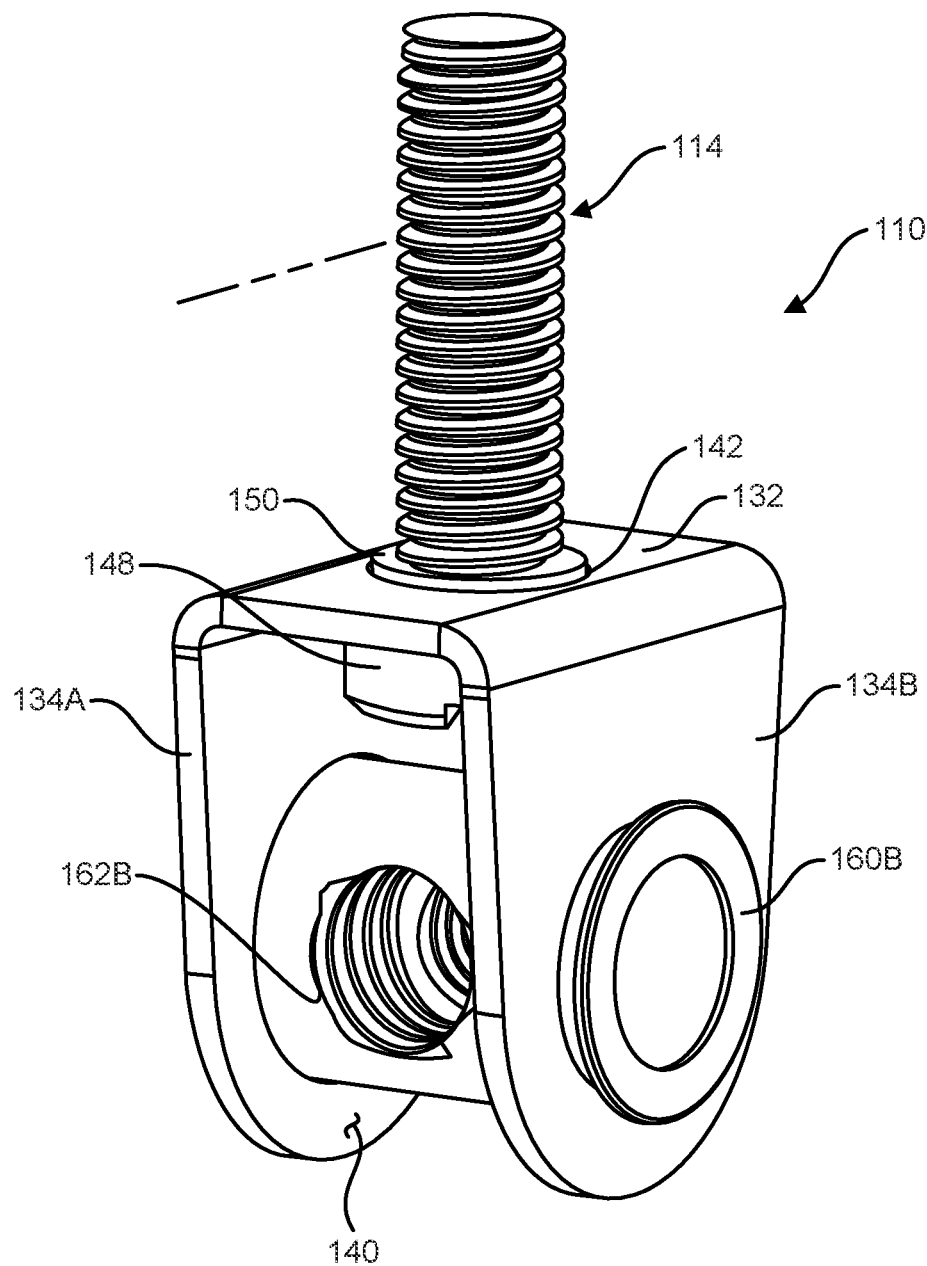
FIG. 11 is a perspective view of a second embodiment of a structure (or upper) attachment for a hanging support system.
Figure 12:
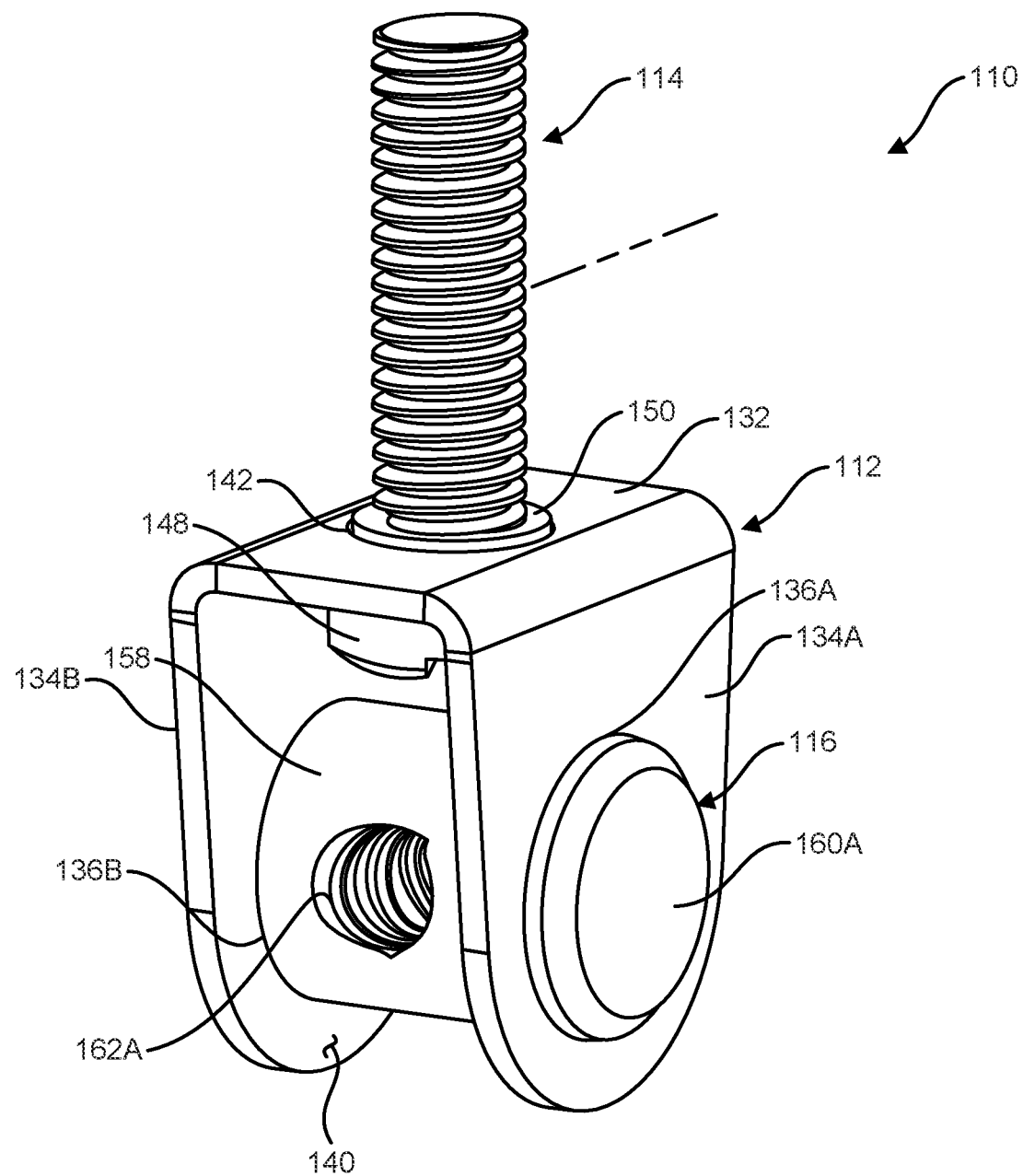
FIG. 12 is another perspective view of the second embodiment of the structure attachment.
Figure 13:
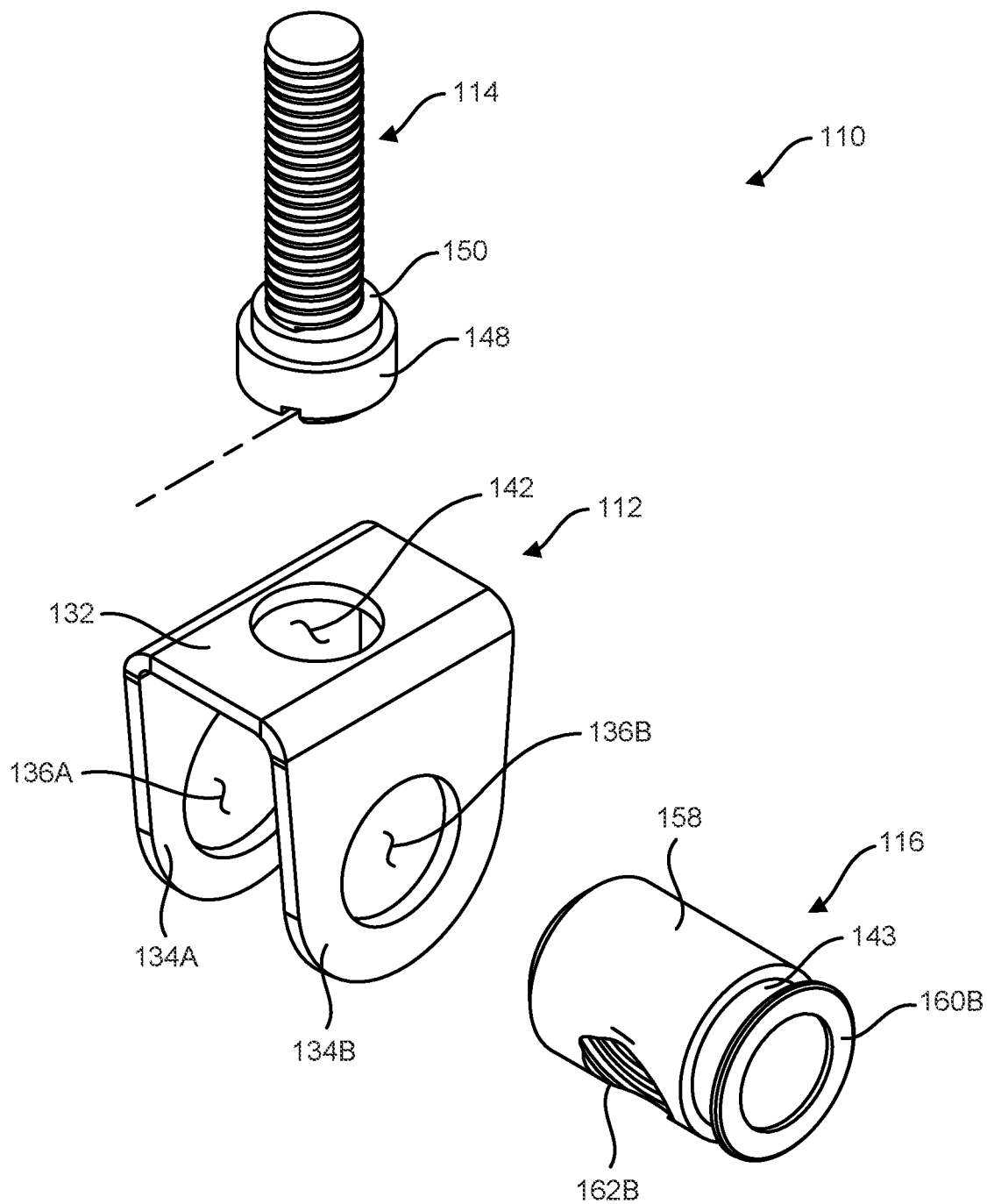
FIG. 13 is an exploded view of the second embodiment of the structure attachment.
Figure 14:
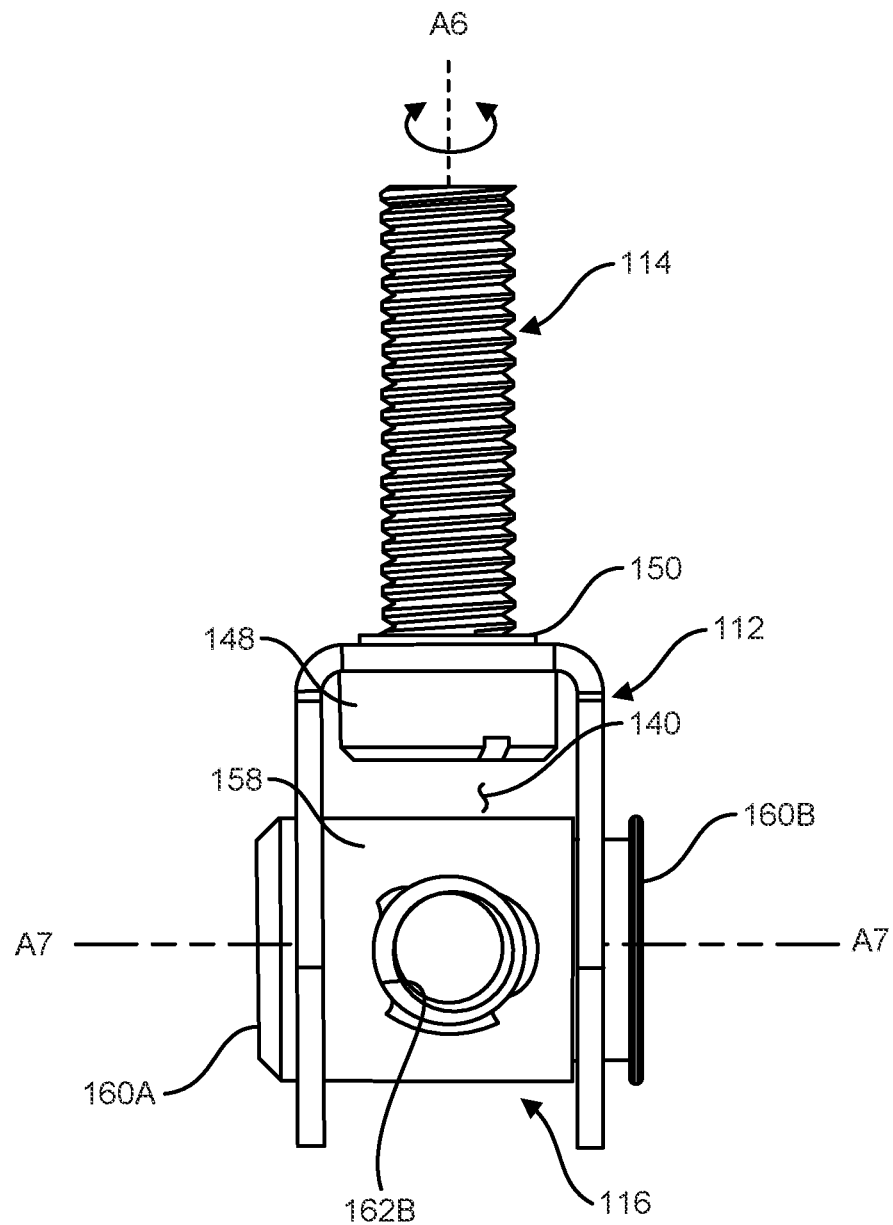
FIG. 14 is a left side view of the second embodiment of the structure attachment.
Figure 15:
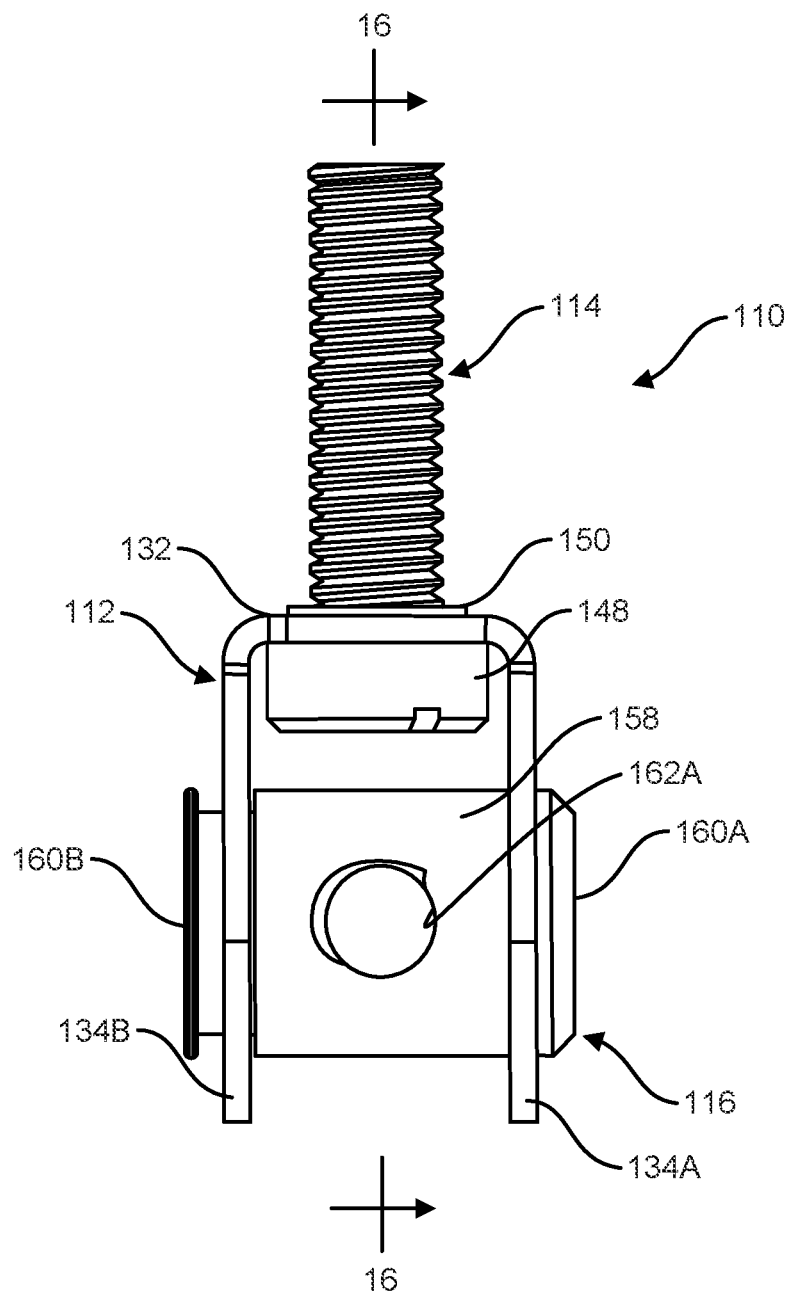
FIG. 15 is a right side view of the second embodiment of the structure attachment.
Figure 16:
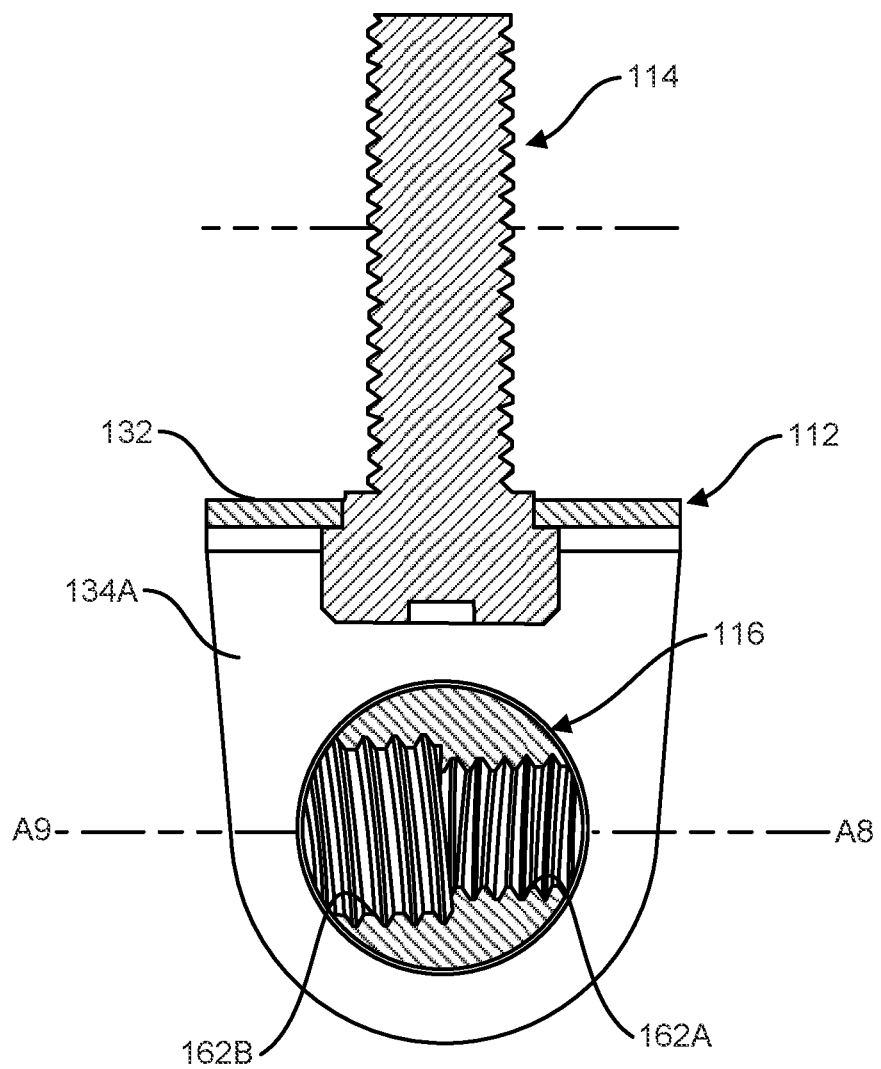
FIG. 16 is a cross section of the second embodiment of the structure attachment taken through line 16-16 of FIG. 15.
Figure 17:
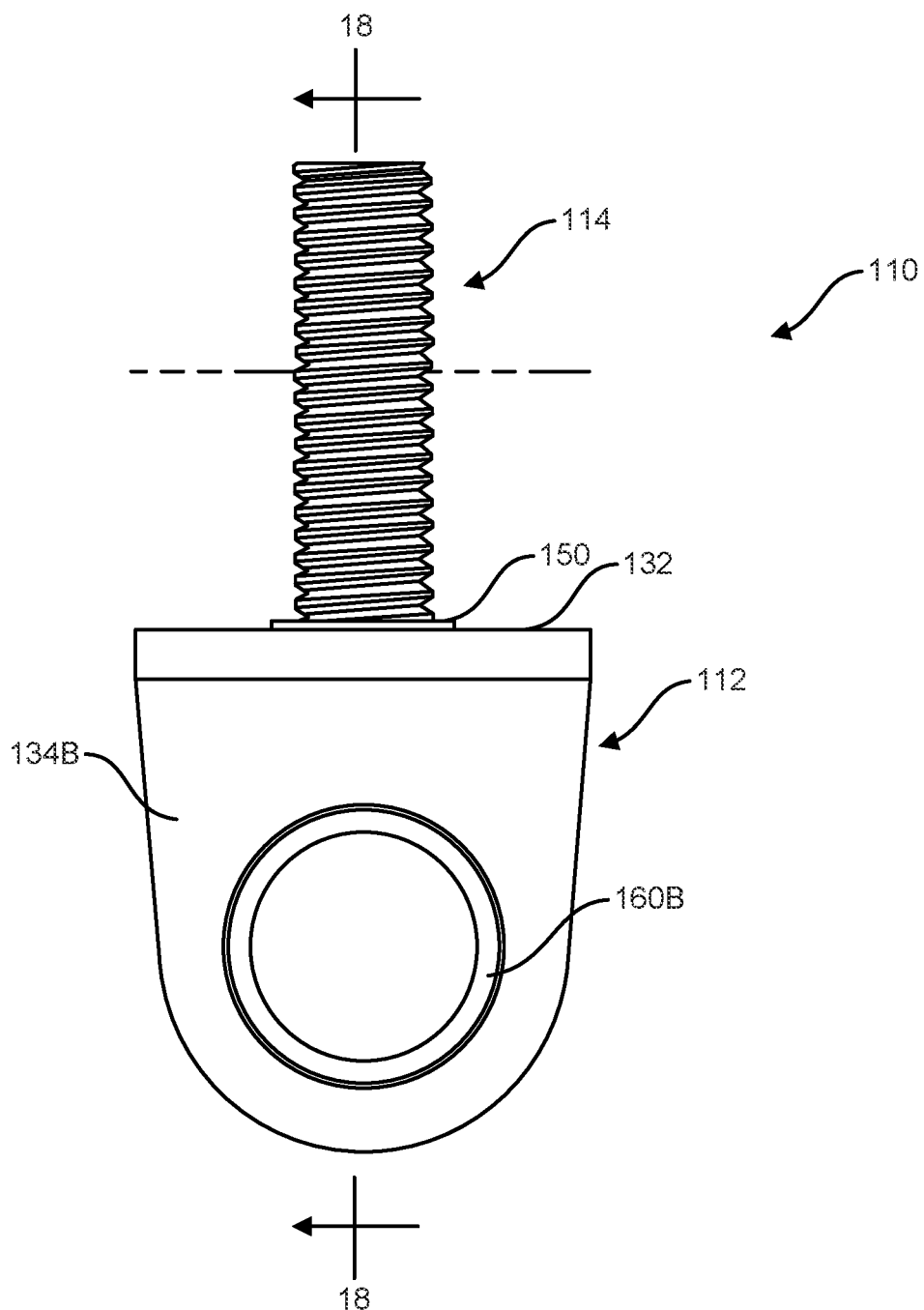
FIG. 17 is a side view of the second embodiment of the structure attachment.
Figure 18:
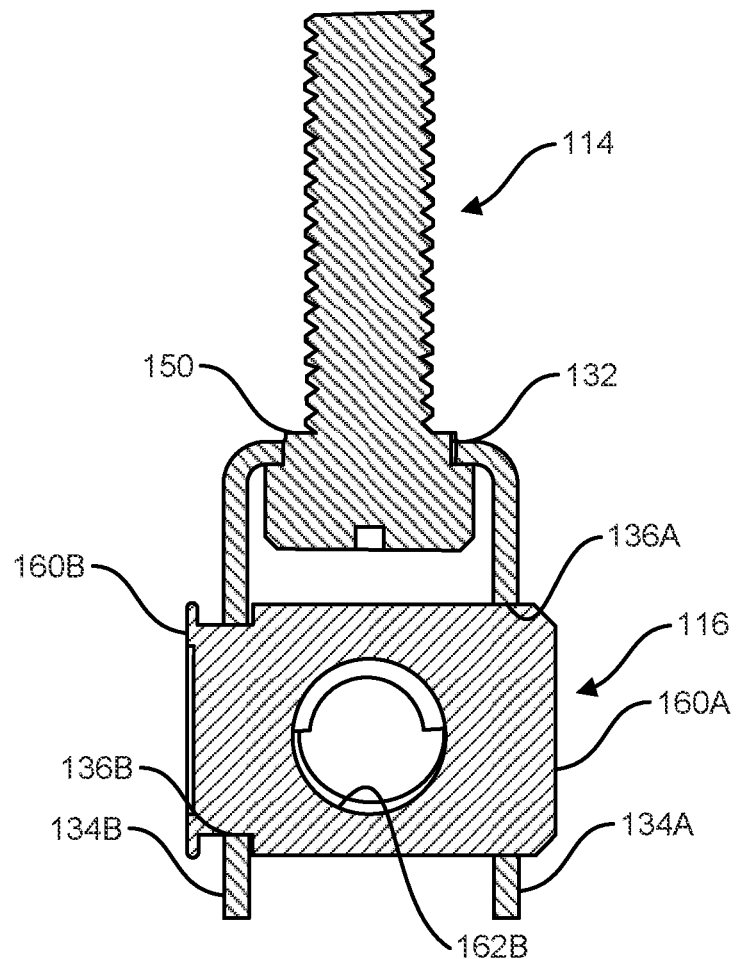
FIG. 18 is a cross section of the second embodiment of the structure attachment taken through line 18-18 of FIG. 17.
Figure 19:
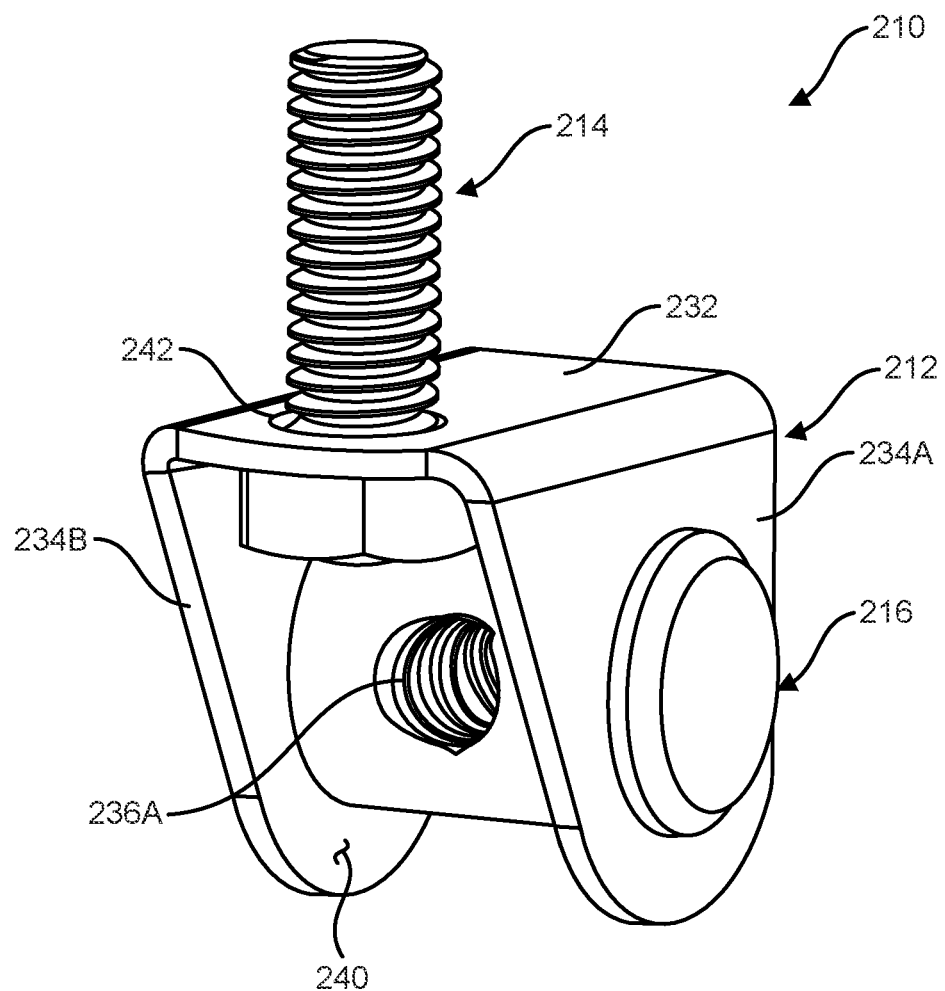
FIG. 19 is a perspective view of a third embodiment of a structure (or upper) attachment for a hanging support system.
Figure 20:
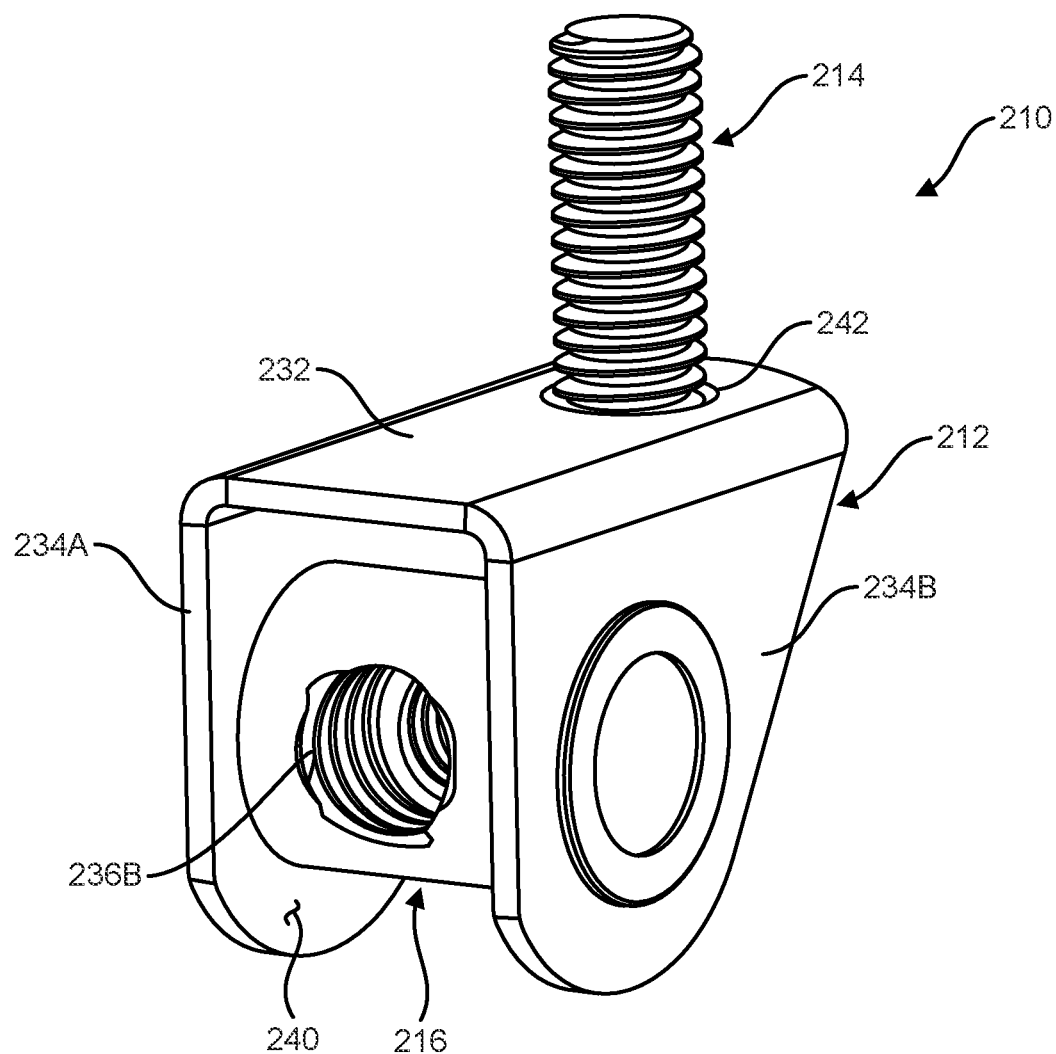
FIG. 20 is another perspective view of the third embodiment of the structure attachment.
Figure 21:
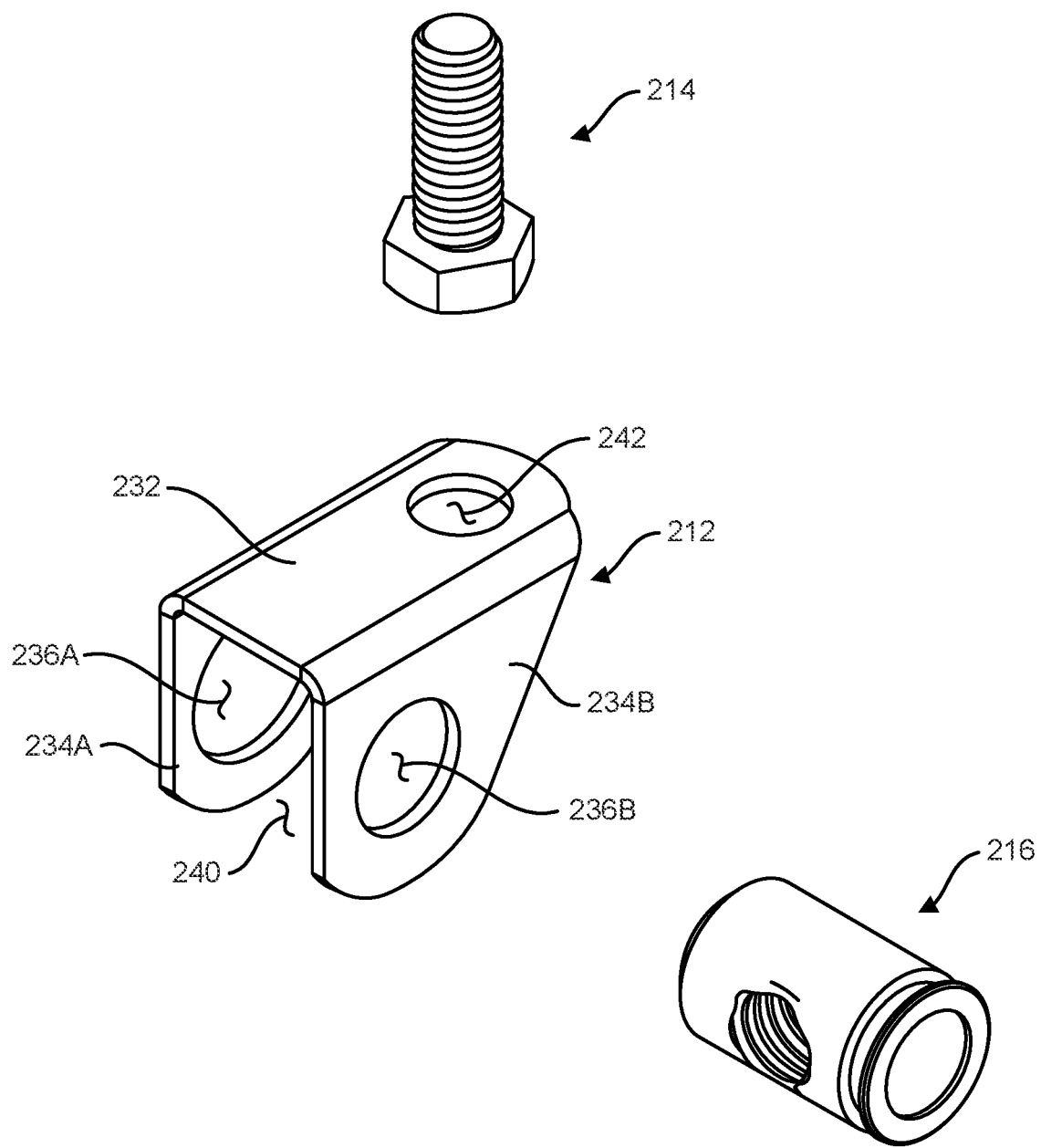
FIG. 21 is an exploded view of the third embodiment of the structure attachment.
Figure 22:
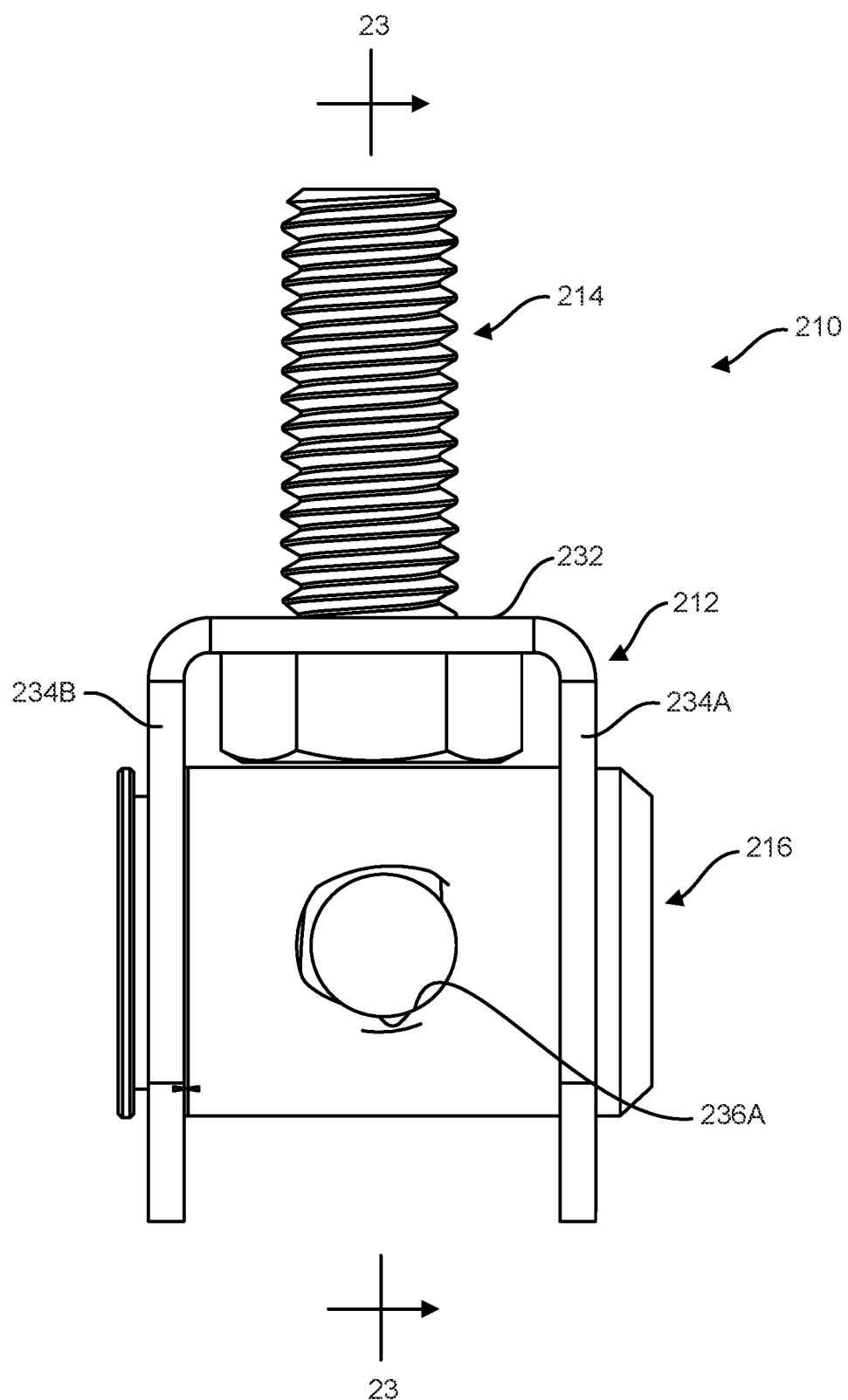
FIG. 22 is a side view of the third embodiment of the structure attachment.
Figure 23:
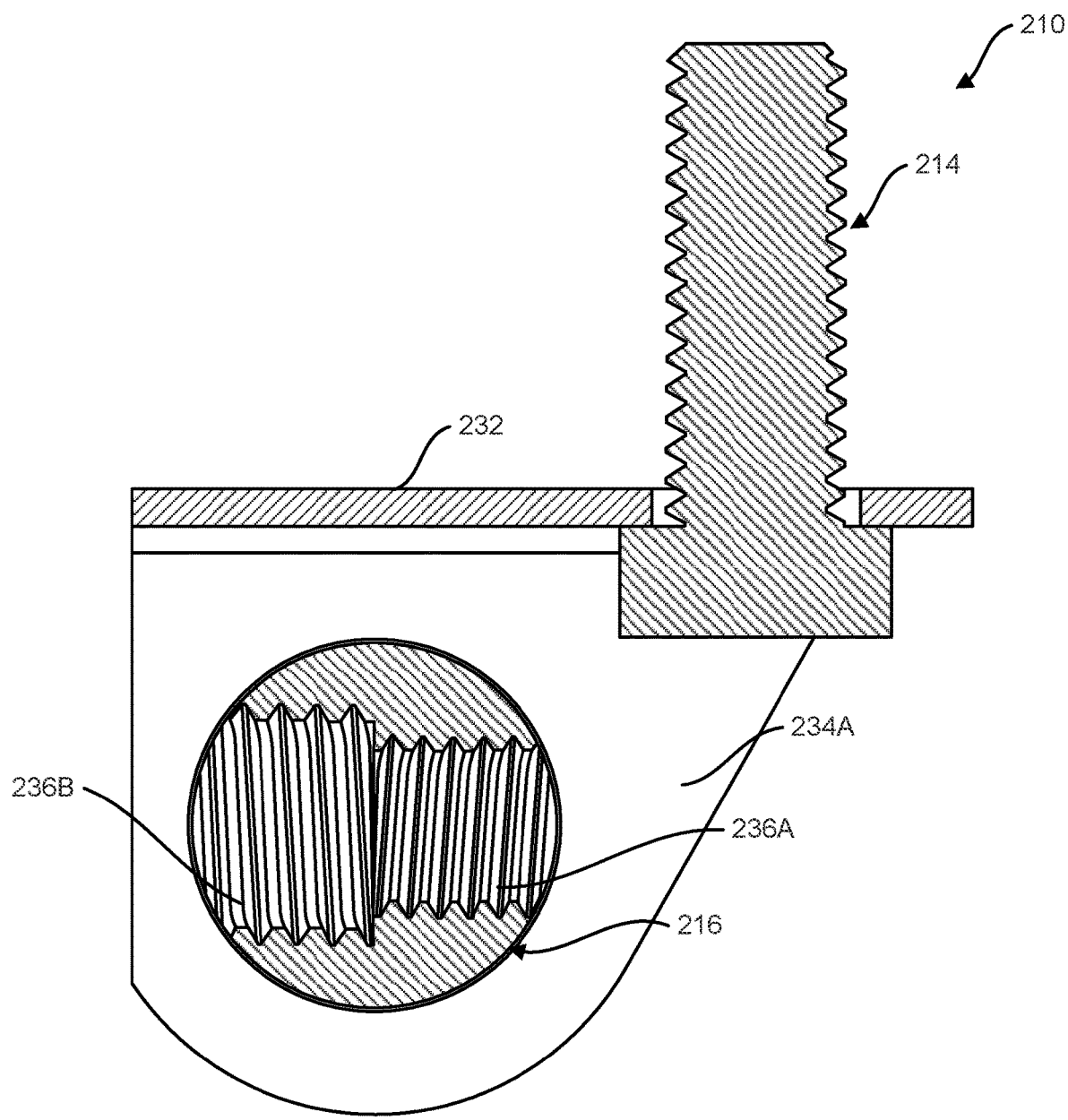
FIG. 23 is a cross section of the third embodiment of the structure attachment taken through 23-23 of FIG. 22.
Figure 24:
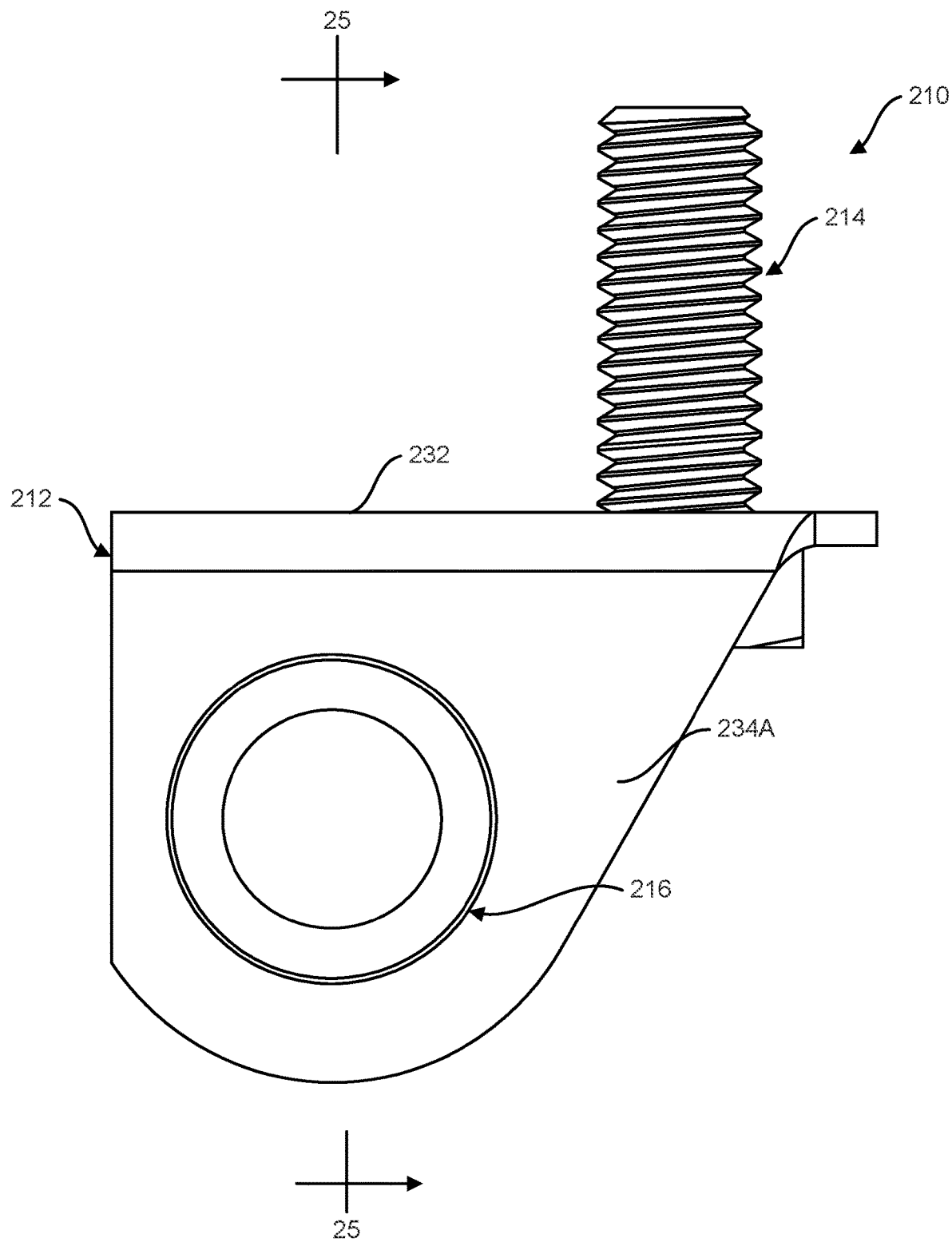
FIG. 24 is a front view of the third embodiment of the structure attachment.
Figure 25:
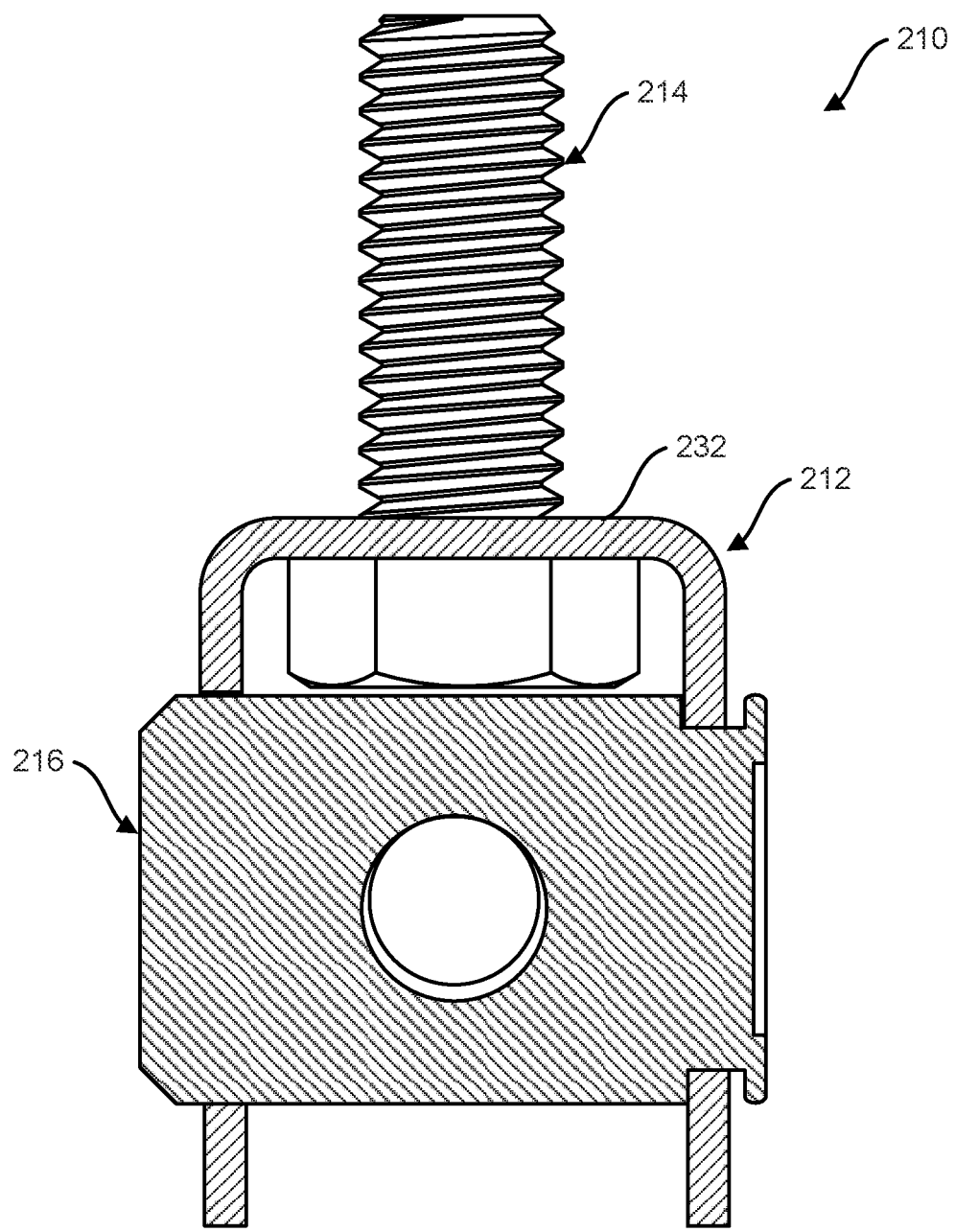
FIG. 25 is a cross section of the third embodiment of the structure attachment taken through line 25-25 of FIG. 24.

The illustrated structure fastener 14 is a threaded fastener (e.g., bolt, screw, of other threaded fastener) configured to be threadably attached to the structure support S. For example, the illustrated threaded fastener 14 is a bolt or screw, which may be threaded into concrete, wood, metal or other material of the support S. In another embodiment, the threaded fastener 14 may be threaded into a mateable component which, in turn, is attached to the structure support S. This mateable component is considered to be part of the structure support. The illustrated threaded fastener 14 is a shoulder bolt (or shoulder screw) including a head 48, a non-threaded shoulder 50 extending longitudinally from the head, and a threaded shaft 52 extending longitudinally from the shoulder. The head 48 defines a tool attachment structure (e.g., an opening or shape) for coupling to a hand-held tool, such as a driver or wrench. As inserted, the shoulder 50 of the fastener 14 is received in the fastener opening 42. The shoulder 50 has a diameter slightly less than the diameter of the fastener opening 42. As shown in FIG. 3, the shoulder 50 functions as a bearing to allow the attachment body 12 to rotate on the fastener about the axis A1 of the fastener (also a rotational axis of the attachment body) when the structure attachment 10 is attached to the structure S. In one or more other embodiments, instead of a shoulder bolt, the structure fastener may include a threaded fastener (e.g., bolt or screw) and a separate bushing or bearing, through which the shaft of the threaded fastener extends, functioning similar to the shoulder of the shoulder bolt to allow rotation of the attachment body on the fastener.

The illustrated rod fastener 16 is generally cylindrical or rod-shaped, having a sidewall 58, opposite longitudinal ends 60, and longitudinal axis A2 extending between the opposite longitudinal ends. The rod fastener 16 defines at least one threaded opening 62A, 62B having an axis A3, A4 extending into the sidewall 58 generally transverse to the longitudinal axis of the fastener 16 and configured to threadably mate with one or more of the threaded rods 22. The at least one threaded opening 62A, 62B is radially aligned with the window 40. Moreover, the rod fastener 16 is selectively rotatable within the attachment body 12—e.g., riding along the interior surface of the channel-shaped wall 30—about its longitudinal axis A2, to selectively adjust the angular position of the at least one threaded opening 62A, 62B about the longitudinal axis A2 and relative to the attachment body 12 and the structure fastener 14. In the illustrated embodiment, the head 50 of the structure fastener 14 engages the rod fastener (or is slightly spaced apart therefrom) to restrict non-rotational movement of the rod fastener in the attachment body 12. As can be seen from FIG. 9, the at least one threaded opening 62A, 62B is accessible and usable through the window 40 at any angular position along about a 180-degree arc around the longitudinal axis A2.

In the illustrated rod fastener 16, the rod fastener 16 defines two threaded openings 62A, 62B having respective axes A3, A4 and configured to receive and mate with rods having different diameters. The first threaded opening 62A has a diameter less than a diameter of the second threaded opening 62B for mating with a first rod having a diameter less than a diameter of a second rod. For example, the first threaded opening 62A may be configured to mate with a ⅜ in threaded rod (e.g., ⅜ in diameter, 16 threads per inch). Also, for example, the second threaded opening 62B may be configured to mate with a ½ in threaded rod (e.g., ½ in diameter, 12 threads per inch). The illustrated threaded openings 62A, 62B (e.g., threaded blind openings) are generally coaxially aligned (e.g., 180 degrees offset) relative to the longitudinal axis A2. The openings 62A, 62B generally meet at the longitudinal axis A2. In one or more other embodiments, the openings 62A, 62B may not be coaxial.

The illustrated rod fastener 16 defines a through opening 66 (e.g., non-threaded opening) configured to receive a tool (e.g., a driver, wrench or other tool) to allow access to the head 48 of the structure fastener 14 within the interior 34 of the attachment body 12. For example, the through opening 66 may be configured to receive a shaft of a screw driver. The through opening 66 is radially aligned with the window 40. In the illustrated embodiment, an axis A5 of the through opening 66 is generally 90 degrees offset from the axes A3, A4 of the openings 62A, 62B and may intersect the axes. The rod fastener 16 is rotatable about the longitudinal axis A2 to position the axis A5 of the through opening 66 in generally alignment (e.g., coaxial) with the axis A1 of the support fastener 14 so that a tool may extend through the rod fastener 14 and engage the support fastener 14. The axial ends of the through opening 66 flare radially outward relative to the longitudinal axis A2 of the rod fastener 14 to facilitate insertion of the tool through the rod fastener.

In one example, the structure attachment 10 is attached to the structure S by aligning the through opening 66 in the rod fastener 14 with the head 50 of the structure fastener 15, inserting the tool through the through opening and into engagement with the head of the fastener, and rotating the rod fastener about its axis A1 using the tool to thread the fastener into the support. The threaded rod 22 is threaded into the corresponding one of the threaded openings 62A, 62B to secure the rod to the structure attachment. The rod fastener 14 may be selectively rotatable to a selected angular position (e.g., angular position a in FIG. 3) at which the rod 22 will extend relative to the axis of the structure fastener 14, for example. The component attachment 24 is attached to the supported component 26 (e.g., a fire sprinkler branch line, an air duct, a water pipe, a conduit, etc.).

Referring to FIGS. 11-18, another embodiment of a structure (upper) attachment is generally indicated at reference numeral 110. The structure attachment 110 generally includes an attachment body, generally indicated at 112; a structure fastener, generally indicated at 114, coupled to the attachment body and configured to fasten the structure attachment to a structural support S (e.g., a structural support of a building); and a rod fastener, generally indicated at 116, coupled to the attachment body and configured to fasten the structure attachment to a threaded rod 22. The structure attachment 110 may be used in place of the structure attachment 10 in FIG. 3 to hang or support the component in a similar fashion.

The illustrated attachment body 112 includes an upper wall 132 and opposing first and second side arms 134A, 134B extending downward from the upper wall defining a window 140. The upper wall 132 defines a fastener opening 142 configured to receive the structure fastener 114 similar to the previous attachment body 12. In fact, the illustrated structure fastener 114 is identical to the structure fastener 14, and therefore, the teachings of the structure fastener 14 apply equally to the structure fastener 114. For example, a shoulder 150 of the fastener 114 is receive in the opening 142 and allows for rotation of the fastener about its axis A6. The side arms 134A, 134B define axially aligned openings 136A, 136B (e.g., non-threaded openings), respectively, sized and shaped to receive the rod fastener 116 therein, as explained below.

The illustrated rod fastener 116 is generally cylindrical or rod-shaped, having a sidewall 158, opposite first and second longitudinal ends 160A, 160B, and a longitudinal axis A7 extending between the opposite longitudinal ends. The rod fastener 116 is selectively rotatable relative to the attachment body 112 about the axis A7. Like the rod fastener 16, the rod fastener 116 defines at least one threaded opening 162A, 162B having an axis A8, A9 extending into the sidewall 158 generally transverse to the longitudinal axis of the fastener 116 and configured to threadably mate with one or more of the threaded rods 22. The rod fastener 116 is generally a barrel nut. The structures and functions of the two threaded openings 162A, 162B are identical to the two threaded openings 62A, 62B, and therefore, the teachings set forth with respect to the threaded openings 62A, 62B apply equally to the threaded openings 162A, 162B.

Unlike the rod fastener 16, a portion adjacent the second longitudinal end 160B of the current rod fastener 116 (and a portion adjacent the second longitudinal end) has a reduced diameter compared to the diameter of the rod fastener adjacent the first longitudinal end 160A. The first opening 136A has a diameter greater than the second openings 136B. The first opening 136A snugly receives the portion of the rod fastener 116 adjacent the first longitudinal end 160A, and the second opening 136B snugly receives the reduced diameter portion adjacent the second longitudinal end 160B. As an example, the rod fastener 116 is inserting axially through the first opening 136A with the second longitudinal end 160B inserted through the first opening and into the second opening 136B. A shoulder 143 at the reduced diameter portion engages the second side arm 134B to inhibit further axial movement of the rod fastener 116. Once inserted, the second longitudinal end 160B may be crimped or otherwise deformed to increase its diameter and inhibit the withdrawal of the rod fastener 116 from the openings 136A, 136B. As such, the rod fastener 116 is retained in the openings 136A, 136B and rotatable therein.

In one example, the attachment body 112 is secured to the support S using the support fastener 114 before securing the rod fastener 116 to the attachment body. With the rod fastener 116 not yet received in the openings 136A, 136B, the head 148 of the structure fastener 114 is accessible through the window 140. After securing the attachment body 112 to the support S, the rod fastener 116 may be secured to the attachment body 112, as described above. In one or more embodiments, the rod fastener 116 may be secured to the attachment body 112 before attaching to the support S. In such an example, the rod fastener 116 may include the through opening 66 described in the rod fastener 14.

Referring to FIGS. 19-25, another embodiment of a structure attachment is generally indicated at reference numeral 210. The structure attachment 210 generally includes an attachment body, generally indicated at 212; a structure fastener, generally indicated at 214, coupled to the attachment body and configured to fasten the structure attachment to a structural support S (e.g., a structural support of a building); and a rod fastener, generally indicated at 216, coupled to the attachment body and configured to fasten the structure attachment to a threaded rod 22. The structure attachment 210 may be used in place of the structure attachment 10 in FIG. 3 to hang or support the component in a similar fashion. The illustrated structure fastener 214 may be identical to the structure fasteners 14, 114, and therefore, the teachings set forth with respect to the fasteners 14, 114 apply equally to the fastener 214. The illustrated rod fastener 216 is identical to the rod faster 116, therefore, the teachings set forth with respect to the rod fastener 114 applies equally to the rod fastener 216.

The illustrated attachment body 212 is similar to the attachment body 112 and includes an upper wall 232 and opposing first and second side arms 234A, 234B extending downward from the upper wall defining a window 240. The upper wall 232 defines a fastener opening 242 configured to receive the structure fastener 214. The side arms 234A, 234B define axially aligned openings 236A, 236B (e.g., non-threaded openings), respectively, sized and shaped to receive the rod fastener 116 therein, as described above with respect to the structure attachment 110.

The main difference between the attachment bodies 112, 212 is that the fastener opening 242 of the attachment body 212 is offset from the rod fastener 216 so that the head of the structure fastener 214 is accessible through the window 240 when the rod fastener is secured to the attachment body. In this way, the attachment body 212 can be assembled before attaching it to the support S.

Figure 26:
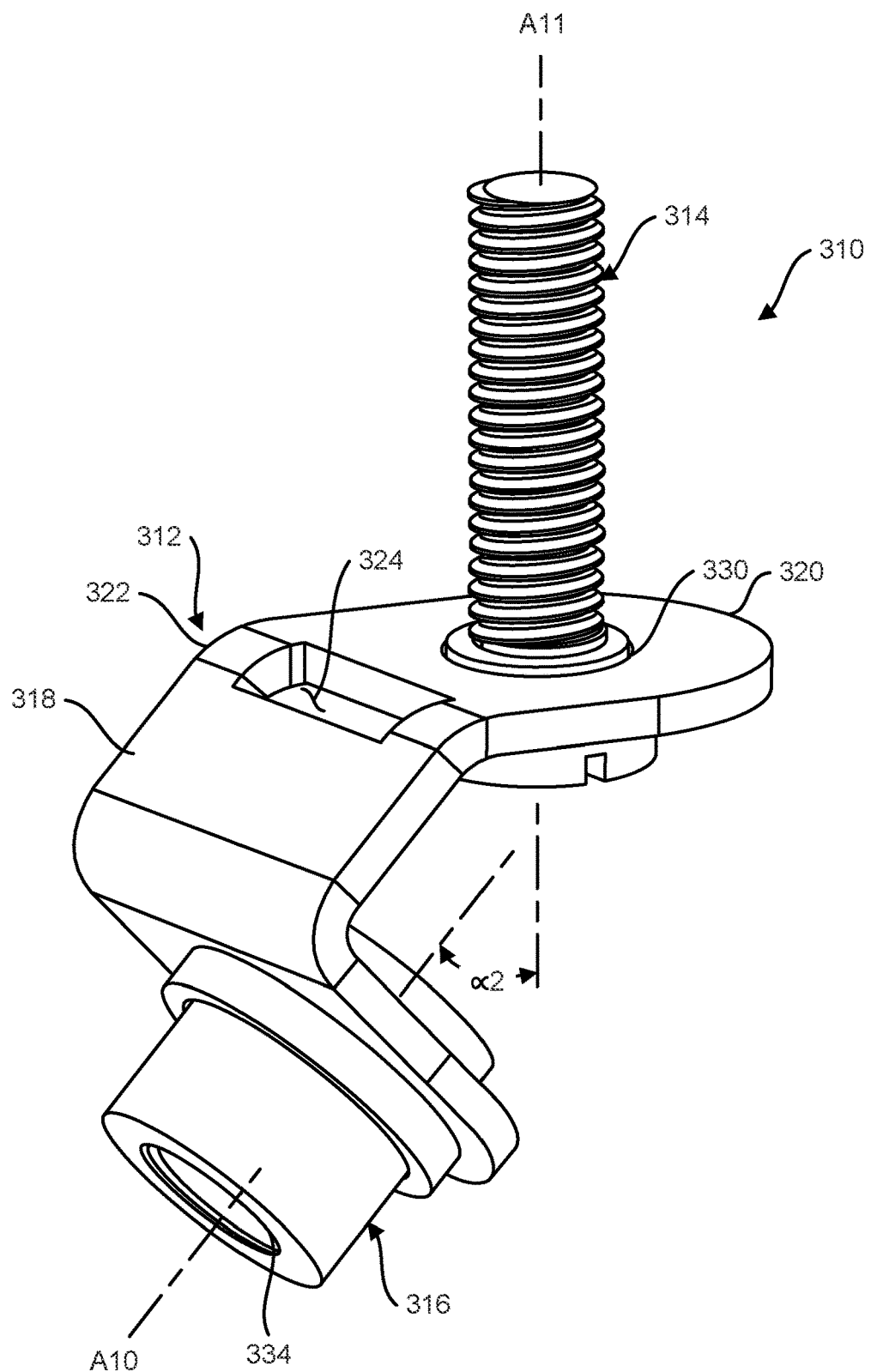
FIG. 26 is a perspective view a fourth embodiment of a structure (or upper) attachment for a hanging support system.
Figure 27:
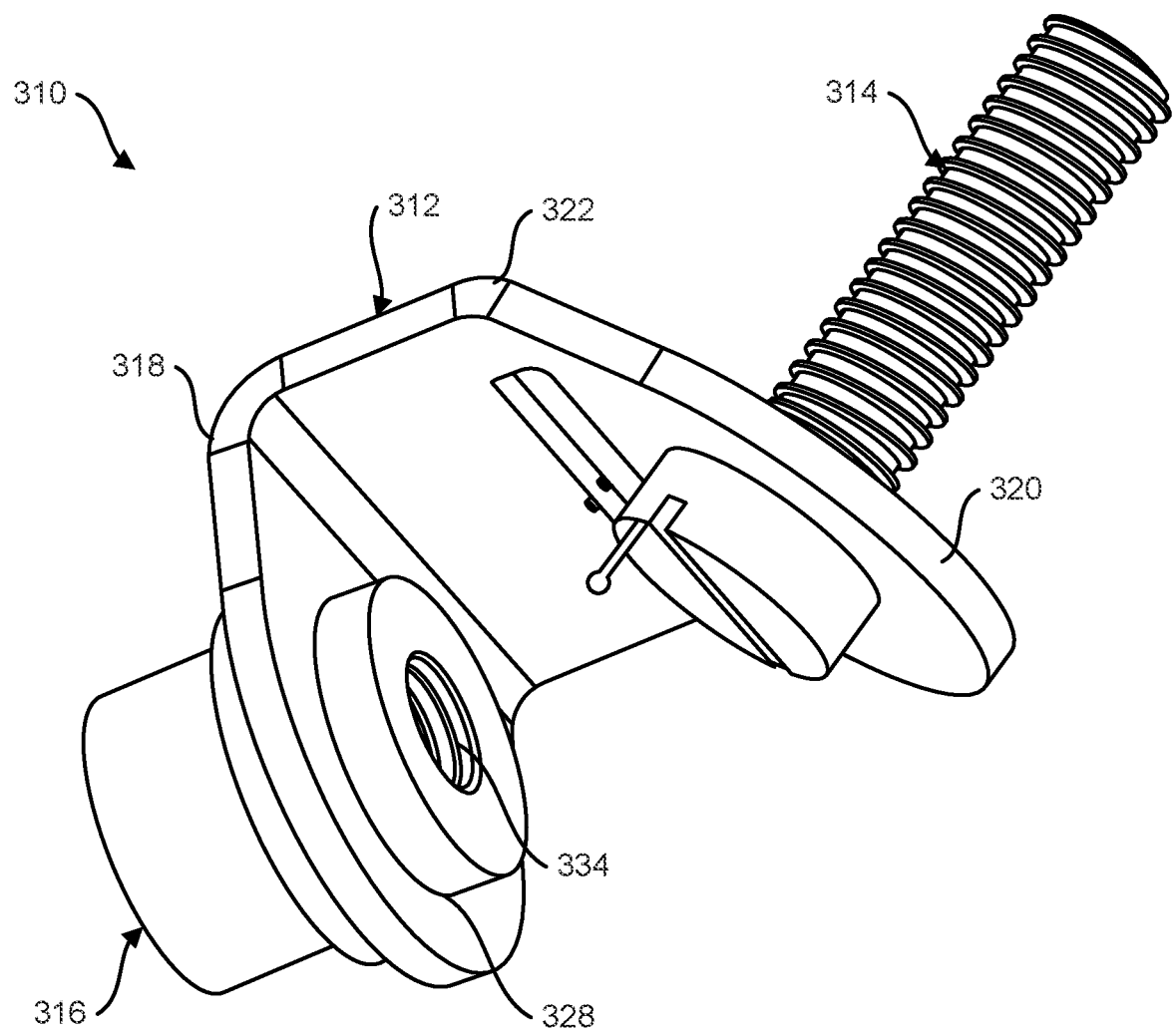
FIG. 27 is another perspective view of the fourth embodiment of the structure attachment.

Referring to FIGS. 26 and 27, another embodiment of a structure (upper) attachment is generally indicated at reference numeral 310. The structure attachment 310 generally includes an attachment body, generally indicated at 312; a structure fastener, generally indicated at 314, coupled to the attachment body and configured to fasten the structure attachment to a structural support S (e.g., a structural support of a building); and a rod fastener, generally indicated at 316, coupled to the attachment body and configured to fasten the structure attachment to a threaded rod 22. The structure attachment 310 may be used in place of the structure attachment 10 in FIG. 3 to hang or support the component in a similar fashion. The illustrated structure fastener 314 may be identical to the structure fasteners 14, 114, and therefore, the teachings set forth with respect to the fasteners 14, 114 apply equally to the fastener 314.

The attachment body 312 includes a bracket 318 having a generally L-shape, and a flange 320 extending from a first longitudinal end of the bracket. The attachment body 312 may be formed as a single, unitary component, such as from sheet metal. The bracket 318 is selectively movable (e.g., rotatable) out of plane relative to the flange 320 about a living hinge 322 connecting a first portion of the bracket to the flange. An opening 324 (e.g., a cutout) in the living hinge 322 allows flexing of the living hinge. A second portion of the bracket 318 may extend perpendicular to the first portion of the bracket. The second portion of the bracket 318 defines an opening 328 in which the rod fastener 316 is received. The flange 320 defines an opening 330 in which the fastener 314 is received in the same manner as the previous embodiments so that the attachment body 312 is rotatable about the axis of the rod fastener. An angle α2 (FIG. 26) at which a longitudinal axis A10 of the rod fastener 316 extends relative to a longitudinal axis A11 of the attachment fastener 314 is selectively adjustable by rotating the bracket 318 about the living hinge 322. In one example, the angle α2 may be selectively adjusted from about 90 degrees to about 0 degrees (e.g., coaxial).

The rod fastener 316 comprises a barrel nut defining a threaded opening 334 extending along the longitudinal axis A10. The threaded opening 334 is configured to threadably mate with the threaded rod 22. The threaded opening 334 may define a first longitudinal portion configured to mate with a ⅜ in threaded rod (e.g., ⅜ in diameter, 16 threads per inch), and a second longitudinal portion configured to mate with a ½ in threaded rod (e.g., ½ in diameter, 12 threads per inch). The rod fastener 316 may be rotatable or fixed within the opening 328.

Figure 28:
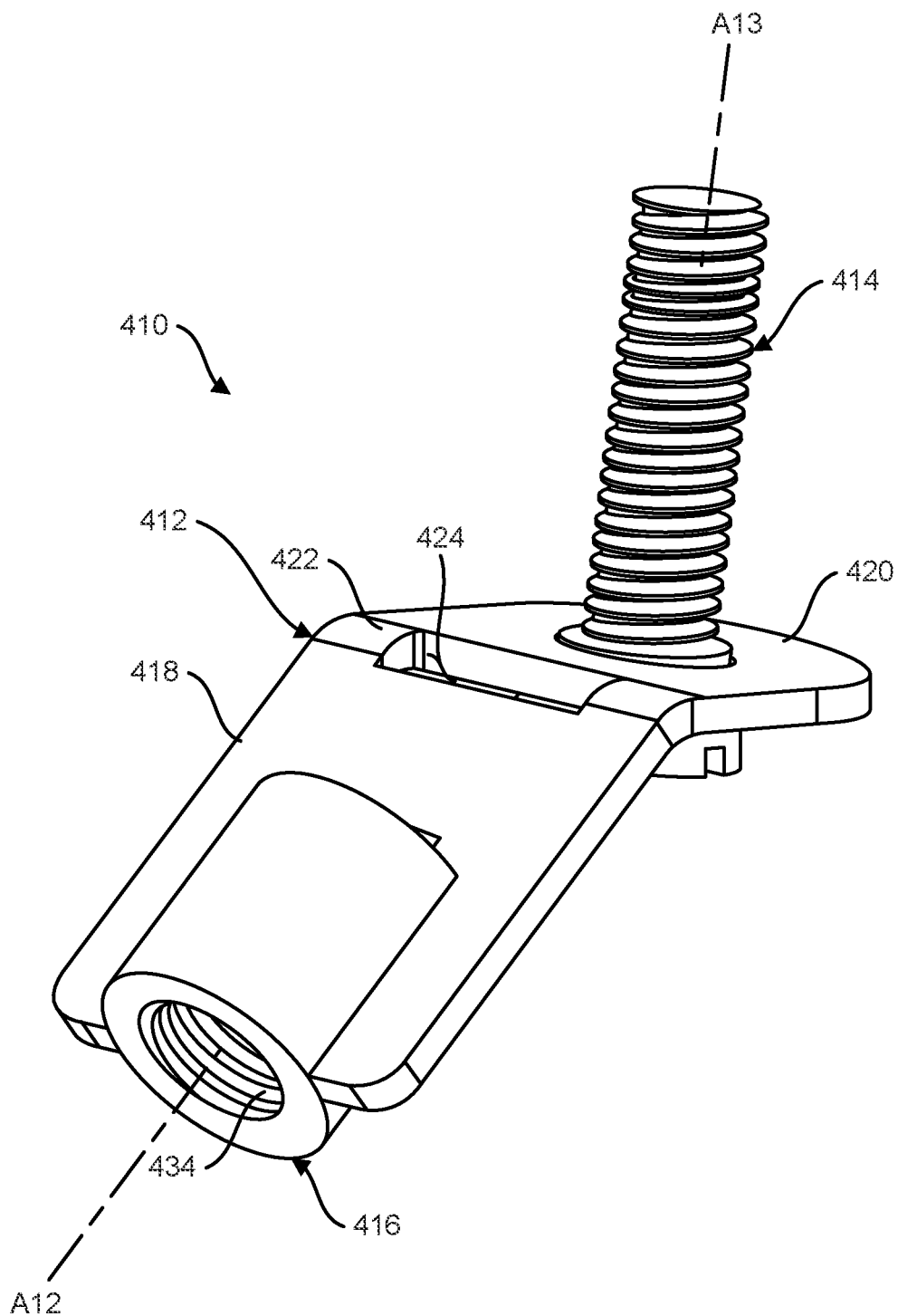
FIG. 28 is a perspective view of a fifth embodiment of a structure (or upper) attachment for a hanging support system.
Figure 29:
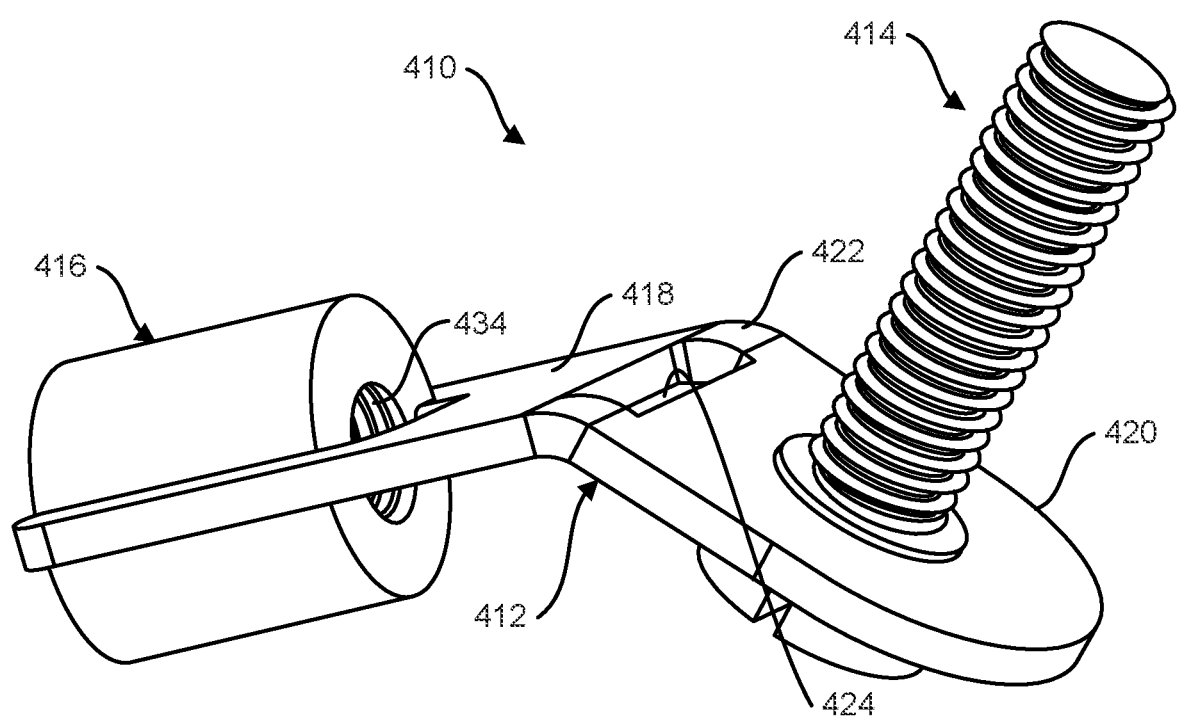
FIG. 29 is another perspective view of the fifth embodiment of the structure attachment.

Referring to FIGS. 28 and 29, another embodiment of a structure (upper) attachment is generally indicated at reference numeral 410. The structure attachment 410 generally includes an attachment body, generally indicated at 412; a structure fastener, generally indicated at 414, coupled to the attachment body and configured to fasten the structure attachment to a structural support S (e.g., a structural support of a building); and a rod fastener, generally indicated at 416, coupled to the attachment body and configured to fasten the structure attachment to a threaded rod 22. The structure attachment 410 may be used in place of the structure attachment 10 in FIG. 3 to hang or support the component in a similar fashion. The illustrated structure fastener 414 may be identical to the structure fasteners 14, 114, and therefore, the teachings set forth with respect to the fasteners 14, 114 apply equally to the fastener 414.

The main difference between the present structure attachment 410 and the structure attachment 310 is the bracket 418 which extends from the flange 420 at the living hinge 422. Unlike the bracket 318, the present bracket 418 is generally planar or flat, rather than L-shaped. In addition, a longitudinal axis A12 of the rod fastener 416 (e.g., barrel nut) extends parallel to (e.g., along) the planar bracket 418. The rod fastener 416 defines a threaded opening 434 extending along the longitudinal axis A12 and may be similar or the same as the threaded opening 334. An angle at which a longitudinal axis A13 of the rod fastener 416 extends relative to the longitudinal axis A12 of the attachment fastener 414 is selectively adjustable by rotating the bracket 418 about the living hinge 422. In one example, the angle may be selectively adjusted from about 90 degrees to about 0 degrees (e.g., parallel).

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A structure attachment for a hanging support system comprising:
    an attachment body;
    a structure fastener coupled to the attachment body and configured to fasten the structure attachment to a structural support; and
    a rod fastener coupled to the attachment body and defining at least one threaded opening configured to mate with a threaded rod, the rod fastener being selectively movable relative to the structure fastener to adjust an angle between an axis of the threaded opening and a longitudinal axis of the structure fastener,
    wherein the at least one threaded opening comprises at least two threaded openings, wherein the first threaded opening has a diameter that is less than a diameter of the second threaded opening.

2. The structure attachment set forth in claim 1, wherein the structure fastener comprises an externally threaded fastener, and wherein the rod fastener comprises a barrel nut.

3. The structure attachment set forth in claim 1, wherein the attachment body defines two axially aligned openings sized and shaped to receive the rod fastener.

4. The structure attachment set forth in claim 1, wherein the rod fastener has a length extending along a longitudinal axis of the rod fastener, the longitudinal axis of the rod fastener being offset from the longitudinal axis of the structure fastener.

5. The structure attachment set forth in claim 1, wherein the attachment body is an integrally formed, one-piece component.

6. The structure attachment set forth in claim 1, wherein the structure fastener comprises a head engaging the rod fastener to restrict non-rotational movement of the rod fastener.

7. A structure attachment for a hanging support system comprising:
- an attachment body;
- a structure fastener coupled to the attachment body and configured to fasten the structure attachment to a structural support; and
- a rod fastener coupled to the attachment body and defining at least one threaded opening configured to mate with a threaded rod, the rod fastener being selectively movable relative to the structure fastener to adjust an angle between an axis of the threaded opening and a longitudinal axis of the structure fastener,
- wherein the attachment body defines a window, wherein the at least one threaded opening of the rod fastener is accessible through the window, and wherein a portion of the structure fastener is accessible through the window.

8. The structure attachment set forth in claim 7, wherein the attachment body comprises an upper wall, a first side arm extending from the upper wall, and a second side arm extending from the upper wall.

9. The structure attachment set forth in claim 8, wherein the first side arm and the second side arm of the attachment body define axially aligned openings for receiving the rod fastener.

\* \* \* \* \*